US012546880B2

(12) United States Patent
Youssef

(10) Patent No.: US 12,546,880 B2
(45) Date of Patent: Feb. 10, 2026

(54) TECHNIQUES FOR RELATIVE LOCATION DETERMINATION

(71) Applicant: APPLE INC., Cupertino, CA (US)

(72) Inventor: Mohamed Youssef, San Diego, CA (US)

(73) Assignee: APPLE INC., Cupertino, CA (US)

(*) Notice: Subject to any disclaimer, the term of this patent is extended or adjusted under 35 U.S.C. 154(b) by 327 days.

(21) Appl. No.: 18/375,180

(22) Filed: Sep. 29, 2023

(65) Prior Publication Data

US 2024/0183972 A1 Jun. 6, 2024

Related U.S. Application Data

(60) Provisional application No. 63/386,077, filed on Dec. 5, 2022.

(51) Int. Cl.
*H04W 64/00* (2009.01)
*G01S 13/02* (2006.01)
*G01S 13/76* (2006.01)

(52) U.S. Cl.
CPC ........ *G01S 13/765* (2013.01); *G01S 13/0209* (2013.01); *H04W 64/00* (2013.01)

(58) Field of Classification Search
CPC .... G01S 13/765; G01S 13/0209; G01S 7/006; H04W 64/00
See application file for complete search history.

(56) References Cited

U.S. PATENT DOCUMENTS

| 10,239,345 | B2 | 3/2019 | Youssef | |
|---|---|---|---|---|
| 2005/0007963 | A1* | 1/2005 | Huang | G01S 5/0289 370/255 |
| 2010/0105409 | A1* | 4/2010 | Agarwal | H04W 64/00 455/456.1 |

OTHER PUBLICATIONS

Mohamed Youssef, "A Thesis Submitted To The Faculty Of Graduate Studies In Partial Fulfilment Of The Requirements For The Interdisciplinary Degree Of Doctoral Of Philosophy," University Of Calgary, Department Of Geomatics Engineering and Department Of Electrical And Computer Engineering, Dec. 2008 in 165 pages.

* cited by examiner

*Primary Examiner* — Robert W Hodge
*Assistant Examiner* — Bongani Jabulani Mashele
(74) *Attorney, Agent, or Firm* — Kilpatrick Townsend & Stockton LLP

(57) ABSTRACT

An electronic device can perform a process for conducting first ranging measurements with a first plurality of electronic devices to obtain first ranging information for a first peer-to-peer coordinate system, the first ranging information providing first relative location information between the mobile device and a first plurality of electronic devices. The method may include generating, using the first ranging information, a first relative location for the mobile device in the first peer-to-peer coordinate system. The device may conduct a second ranging measurements with a second plurality of electronic devices to obtain second ranging information for a second peer-to-peer coordinate system, the second ranging information providing second relative location information between the mobile device and a second plurality of electronic devices, where the first plurality of electronic devices are not within peer-to-peer communication range with the second plurality of electronic devices.

20 Claims, 13 Drawing Sheets

Perform, using the first antenna, a first range measurement with a second electronic device to obtain a first circle of possible positions of the second electronic device
705

Perform, using the second antenna, a second range measurement with the second electronic device to obtain a second circle of possible positions of the second electronic device, wherein the first antenna is at a same vertical height as the second antenna
710

Determine two potential locations of the second electronic device based on an intersection of the first circle and the second circle
715

Determine a type of device for the second electronic device
720

Determine an actual location of the second electronic device between the two potential locations based on the type of device for the second electronic device
725

FIG. 7

TECHNIQUES FOR RELATIVE LOCATION DETERMINATION

BACKGROUND

This application claims priority to U.S. Provisional Patent Application No. 63/386,077, filed Dec. 5, 2022, entitled "Techniques For Relative Location Determination," which is herein incorporated by reference in its entirety and for all purposes.

BACKGROUND

Determining a position of an object can require knowledge of a location of a reference point and a range from the reference point to the object. In certain instances, Global Navigation Satellite System (GNSS) (e.g., GPS) information is unavailable to determine the fixed location of the reference point. The lack of sufficient satellite information can be due to signal blockage as may occur from dense foliage, buildings in an urban environment, locations indoors or underground (e.g., parking garages), and other gaps in signal coverage. And it can be difficult to determine the relative locations among various devices in a large building. Further, antenna configurations may be limited in devices, thereby inhibiting the ability to determine relative location.

BRIEF SUMMARY

Certain embodiments are directed to techniques (e.g., a device, a method, a memory or non-transitory computer readable medium storing code or instructions executable by one or more processors) for relative location determination. Electronic devices can use wireless communication techniques, such as time-of-flight (e.g., using radio frequency (RF) ranging e.g., ultra-wideband (UWB) ranging) or received signal strength indication values (e.g., Wi-Fi or Bluetooth), to generate a local coordinate system between the devices that does not rely on any fixed infrastructure. If one of the devices may be able to generate a real-world fix (e.g., using GNSS information), the information can be shared with the other devices in the peer-to-peer network.

In certain circumstances, a location (e.g., home, or building, or a venue) can have multiple separate peer-to-peer networks that may each include nodes that overlap in each network. The separate peer-to-peer networks can be generated because of the limited communication range for the devices. A tie node can be used to link two or more separate local coordinate systems together.

Intuitive information about the electronic devices and communication system can also be used to resolve location ambiguity. For example, a desktop computer may have a wireless transmitter located in a keyboard for the desktop computer. The keyboard may normally be located in front of the display of the desktop computer. This intuitive information can be used to resolve the location ambiguity generated by some ranging techniques. In some embodiments, a wireless transceiver in a wearable device (e.g., an electronic watch or glasses) can also be used to resolve ambiguity in ranging using localization techniques because the wearable device can be worn on a wrist of a user for an electronic watch or on the face of a user for electronic glasses.

Mobile devices (e.g., a smart phone, a tablet computer, a laptop computer, or a wearable device) can be used to synchronize two local coordinate systems. For example, a location can have two desktop computers (e.g., iMac) each having a ranging capability. Each desktop computer can generate its own peer-to-peer network, but the computing devices can be far apart from each other and cannot wirelessly communicate with each other. As a user with a mobile device roams the location, the mobile device can be localized in both coordinate systems for each computing device. The two independent coordinate systems for each computing device can be transformed into one universal coordinate system using information from the mobile device.

In an aspect a method performed by a first electronic device having a first antenna and a second antenna for resolving localization ambiguity in a peer-to-peer network of multiple electronic devices can include performing, using the first antenna, a first range measurement with a second electronic device to obtain a first circle of possible positions of the second electronic device. The method can include performing, using the second antenna, a second range measurement with the second electronic device to obtain a second circle of possible positions of the second electronic device. The first antenna can be at a same vertical height as the second antenna. The method can include determining two potential locations of the second electronic device based on an intersection of the first circle and the second circle. The method can include determining a type of device for the second electronic device. The method can include determining an actual location of the second electronic device between the two potential locations based on the type of device for the second electronic device.

In various embodiments at least one of the first range measurement and the second range measurement between the first range measurement and the second range measurement is calculated by measuring a round trip time of a wireless signal.

In various embodiments, the method can include generating a local coordinate system that includes a first location of the first electronic device and the actual location of the second electronic device. The method can include storing the local coordinate system within a memory of the first electronic device.

In various embodiments, the method can include performing, using the first antenna, a third range measurement with a third electronic device to obtain a third circle of possible positions of the third electronic device. The method can include performing, using a third antenna, a fourth range measurement with the third electronic device to obtain a fourth circle of possible positions of the third electronic device. The method can include determining a location of the third electronic device within the local coordinate system based on an intersection of the third circle and the fourth circle.

In various embodiments, the third electronic device has established a geographic location, and the method can include determining a first geographic location for the first device and a second geographic location of the second device based on the location of the third electronic device within the local coordinate system.

In various embodiments, the first electronic device comprises a desktop computer and the second electronic device comprises a wireless keyboard.

In various embodiments, at least one of the first range measurement or the second range measurement is determined using ultra-wideband ranging.

In an aspect a method, performed by a mobile device for transforming two or more independent coordinate systems of peer-to-peer communication networks, the method can include performing first ranging measurements with a first plurality of electronic devices to obtain first ranging information for a first peer-to-peer coordinate system. The first ranging information can provide first relative location information between the mobile device and a first plurality of electronic devices.

The method can include generating, using the first ranging information, a first relative location for the mobile device in the first peer-to-peer coordinate system.

The method can include performing second ranging measurements with a second plurality of electronic devices to obtain second ranging information for a second peer-to-peer coordinate system, the second ranging information providing second relative location information between the mobile device and a second plurality of electronic devices. In various embodiments, the first plurality of electronic devices are not within peer-to-peer communication range with the second plurality of electronic devices.

The method can include generating, using the second ranging information, a second relative location for the mobile device in the second peer-to-peer coordinate system.

The method can include determining translation factors between the first peer-to-peer coordinate system and the second peer-to-peer coordinate system using the first relative location and the second relative location.

The method can include generating a universal coordinate system for the first peer-to-peer communication system and the second peer-to-peer communication system using the translation factor. The universal coordinate system can provide a relative location between a first device of the plurality of first devices and a second device of the plurality of second devices.

In various embodiments, at least one of the first ranging measurements and the second ranging measurements are calculated by measuring a round trip time of a wireless signal.

In various embodiments, at least one of the first ranging measurements or the second ranging measurements is determined using ultra-wideband ranging.

In various embodiments, the two or more independent coordinate systems of peer-to-peer communication networks comprise multiple levels of an underground parking garage.

In various embodiments, the method can include determining a location of the mobile device within a structure based on the universal coordinate system.

Responsive to the location of the mobile device within the structure being within predetermined limits, the method can include receiving an input for a virtual note. The method can include sending the location of the mobile device and the input for the virtual note to a second electronic device.

In various embodiments, the method can include determining a location of the mobile device within a structure based on the universal coordinate system. Responsive to the location of the mobile device within the structure being within predetermined limits, the method can include retrieving a virtual note from a memory of the mobile device. The method can include presenting the virtual note on a display of the mobile device.

In various embodiments, the method can include determining a location of the mobile device within a structure based on the universal coordinate system. Responsive to the location of the mobile device within the structure being within predetermined limits, the method can include transmitting a wireless signal to a vehicle to perform an operation on the vehicle.

In various embodiments, the operation comprises unlocking a vehicle door. At certain positions with respect to the vehicle, the operation can include one or more of: starting the vehicle engine, opening the trunk, unlocking a fuel latch.

In various embodiments, the method can include determining a location of an electronic tag within a structure based on the universal coordinate system. The method can include accessing a virtual map of the structure. The method can include displaying the location of the electronic tag in the virtual map of the structure.

In an aspect a computing device, can include one or more memories; and one or more processors in communication with the one or more memories and configured to execute instructions stored in the one or more memories to perform one or more operations as described above.

In an aspect a non-transitory, computer-readable medium storing a plurality of instructions that, when executed by one or more processors of a computing device, cause the one or more processors to perform one or more operations as described above.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 7 illustrates a flowchart for a technique for locating an electronic device.

Like reference symbols in the various drawings indicate like elements, in accordance with certain example implementations. In addition, multiple instances of an element may be indicated by following a first number for the element with a letter or a hyphen and a second number.

DETAILED DESCRIPTION

Figure 1:
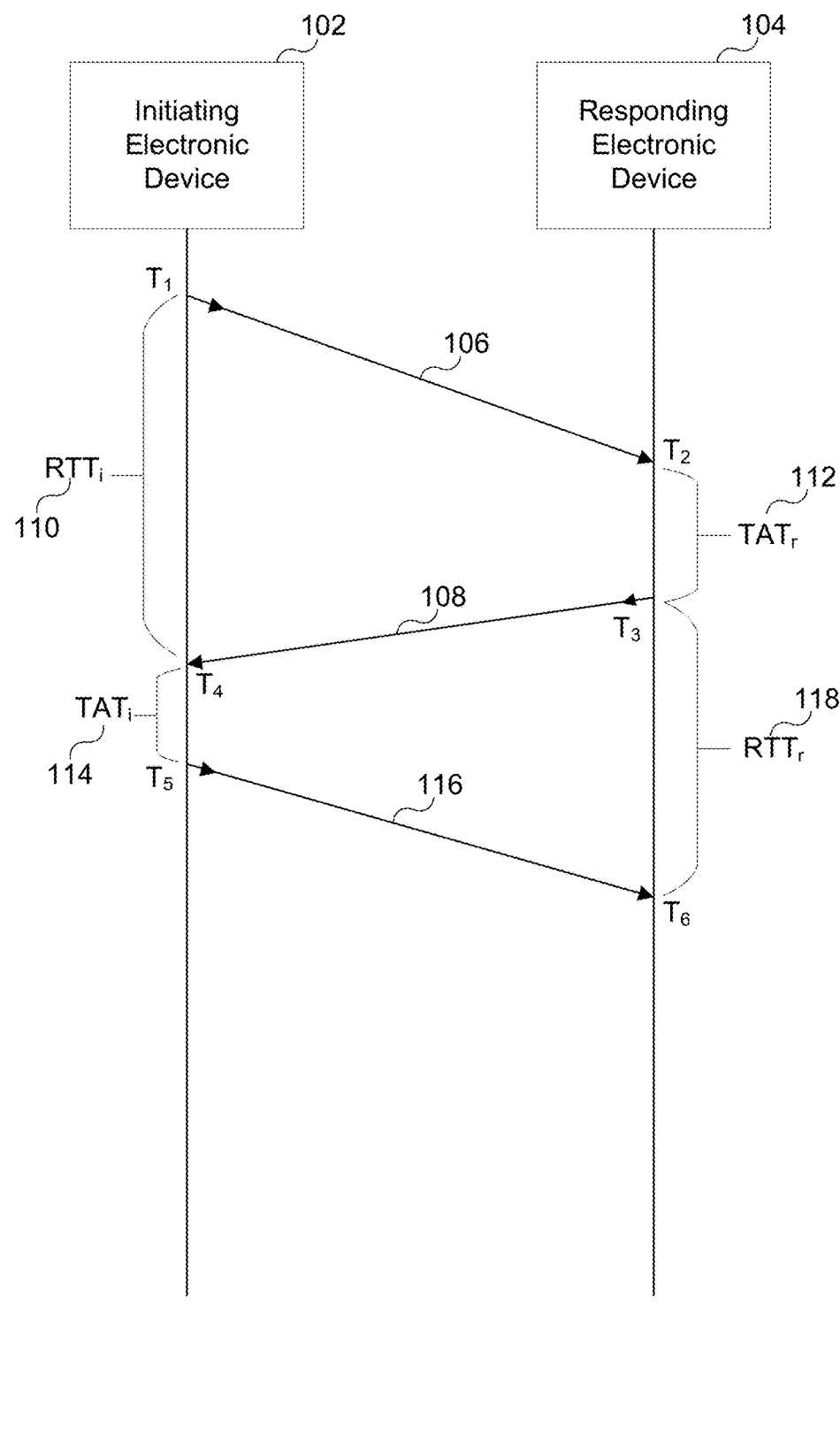
FIG. 1 shows a sequence diagram for performing a ranging measurement between two electronic devices according to embodiments of the present disclosure.

Certain embodiments are directed to techniques (e.g., a device, a method, a memory or non-transitory computer readable medium storing code or instructions executable by one or more processors) for relative location determination. Electronic devices can use wireless communication techniques (e.g., RF ranging, e.g., ultra-wideband (UWB) ranging, received signal strength indication values (e.g., Wi-Fi or Bluetooth) to generate a local coordinate system between the devices that does not rely on any fixed infrastructure. If one of the devices may be able to generate a real-world fix (e.g., using GNSS information), the information can be shared with the other devices in the peer-to-peer network.

Relative localization techniques can use information from various electronic devices for building a local coordinate system. The local coordinate system can be between various participating electronic devices. The participating electronic devices can communicate with each other in a peer-to-peer fashion. To accurately determine an angle of arrival for wireless signals, three wireless antennas can be utilized. Various electronic devices (e.g., computing devices) may have a limited number of wireless antennas. If range is used for localization techniques, there can be ambiguity issues as to the true location of the electronic devices because range circles can intersect at more than one point.

In certain circumstances, a location (e.g., home, or building, or a venue) can have multiple separate peer-to-peer networks that may each include nodes that overlap in each network. The separate peer-to-peer networks can be generated because of the limited range for the devices. A tie node can be used to link the two separate local coordinate systems together.

Intuitive information can also be used to resolve an ambiguity in the location of the transmitting device. For example, a desktop computer may have a wireless transmitter located in a keyboard for the desktop computer. The keyboard may normally be located in front of the display of the desktop computer. This intuitive information can be used to resolve an ambiguity generated by ranging techniques. In some embodiments, a wireless transceiver in a wearable device (e.g., an electronic watch or glasses) can be used to resolve ambiguity in ranging localization techniques.

Mobile devices can be used to synchronize two local coordinate systems. For example, a location can have two desktop computers (e.g., iMac) each having a ranging capability. Each desktop computer can generate its own peer-to-peer network, but the desktop computers can be far apart from each other and not wirelessly communicate with each other. As a user with a mobile electronic device (e.g., a smartphone or a wearable device) roams the location, the mobile electronic device can be localized in both coordinate systems for each desktop computer. The two independent coordinate systems for each desktop computer can be transformed into one universal coordinate system using information from the mobile device.

Certain embodiments are directed to techniques (e.g., a device, a method, a memory or non-transitory computer readable medium storing code or instructions executable by one or more processors) for localization techniques.

A brief review of ranging and triangulation techniques follows below.

I. Ranging/Triangulation Techniques

A mobile device can include circuitry for performing ranging measurements. Such circuitry can include one or more dedicated antennas (e.g., three antennas) and circuitry for processing measured signals. The ranging measurements can be performed using the time-of-flight of pulses between the two electronic devices. In some implementations, a round-trip time (RTT) is used to determine distance information, e.g., for each of the antennas. In other implementations, a single-trip time in one direction can be used. The pulses may be formed using RF waves e.g., ultra-wideband (UWB) radio technology.

A. Sequence Diagram

FIG. 1 shows a sequence diagram 100 for performing a ranging measurement between an initiating device and a responding electronic device according to embodiments of the present disclosure. The two electronic devices may belong to the same user. In various embodiments, the initiating electronic device can be a mobile device (e.g., a smart phone), a tablet computer, a laptop computer, or an electronic tag. The responding electronic device can be a mobile device (e.g., a smart phone), a tablet computer, or a laptop computer. The initiating electronic device can be electronically paired with the responding electronic device. The pairing process can provide the responding device with an identifier of the initiating electronic device. As described in more detail later, such an identifier can be used for authentication purposes, e.g., so ranging is not performed with unknown devices. Although FIG. 1 shows a single cycle of three packet exchanges (i.e., called ping-pong-ping), the process can be repeated to perform multiple measurements over a time interval as part of a ranging session, where such measurements can be averaged or otherwise analyzed to provide a single distance value, e.g., for each antenna.

An initiating electronic device 102 can initiate a ranging operation by transmitting a ranging request 106 to a responding electronic device 104 (e.g., a mobile device). Ranging request 106 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth Low Energy (BLE).

At $T_1$, the initiating electronic device 102 transmits ranging request 106. At $T_2$, the responding electronic device 104 receives ranging request 106. $T_2$ can be an average received time when multiple pulses are in the first set of one or more pulses. The responding electronic device 104 can be expecting the ranging request 106 within a time window based on previous communications, e.g., using another wireless protocol (e.g., BLE). The ranging wireless protocol and another wireless protocol can be synchronized so that responding electronic device 104 can turn on the ranging antenna(s) and associated circuitry for a specified time window, as opposed to leaving them on for an entire ranging session.

In response to receiving the ranging request 106, the responding electronic device 104 can transmit ranging response 108. As shown, ranging response 108 can be transmitted at time $T_3$, e.g., a transmitted time of a pulse or an average transmission time for a set of pulses. $T_2$ and $T_3$ may also be a set of times for respective pulses. Ranging response 108 can include times $T_2$ and $T_3$ so that initiating electronic device 102 can compute distance information. The initiating electronic device 102 can receive the ranging response 108 at time $T_4$. Like the other times, $T_4$ can be a single time value or a set of time values. The time between $T_4$ and $T_1$ can be called the round-trip time initiator (RTTi) 110. The initiating electronic device 102 can calculate distance information by first calculating the RTTi 110. The responding electronic device 104 can calculate the turn-around time responder (TATr) 112. The TATr 112 can be the time difference between $T_3$ and $T_2$. The TATr 112 can be transmitted to the initiating electronic device 102 as part of the ranging response 108. The TATr 112 can also be transmitted to the initiating electronic device 102 using a different wireless protocol (e.g., BLE). The initiating electronic device 102 can receive the TATr 112 in the ranging response 108. The initiating electronic device 102 can also receive the TATr 112 via a different wireless protocol (e.g., BLE). A first range can be calculated by subtracting the TATr 112 from the RTTi 110 and multiplying the difference by the speed of light (c). More complex calculations can also be used, e.g., when the times correspond to sets of times for sets of pulses and when a frequency correction is implemented.

The first range can be transmitted from the initiating electronic device 102 to the responding electronic device 104 by including the information on the second response message 116. The first range can be transmitted to the responding electronic device 104 using a different wireless protocol (e.g., BLE). The ranging response 108 can also include an identifier for the initiating electronic device 102, an identifier for the responding electronic device 104, or both.

The initiating electronic device 102 can receive a ranging response 108 at time $T_4$. Reception of the ranging response 108 can cause the initiating electronic device 102 to generate a second response message 116. The second response message 116 can be transmitted at time $T_5$. The initiating electronic device 102 can calculate a turn-around time initiator (TATi) 114 as the difference in time between $T_5$ and $T_4$. The second response message 116 can include the value for the TATi 114. The TATi 114 can be transmitted to the responding electronic device 104 via a different wireless protocol (e.g., BLE). The second response message 116 can also include an identifier for the initiating electronic device 102, an identifier for the responding electronic device 104, or both. The responding electronic device 104 can receive the second response message 116 at time $T_6$. Like the other times, $T_6$ can be a single time value or a set of time values. The responding electronic device 104 can calculate a round-trip time responder (RTTr) as the difference between $T_6$ and $T_3$. The second responder device 104 can subtract the TATi 114 from the RTTr 118. A second range between the devices can be calculated by multiplying the difference between RTTr 118 and TATi 114 by the speed of light (c). More complex calculations can also be used, e.g., when the times correspond to sets of times for sets of pulses and when a frequency correction is implemented. The second range can be transmitted to the initiating electronic device 102 using a different wireless protocol (e.g., BLE).

B. Triangulation to Determine Angle of Arrival

Figure 2:
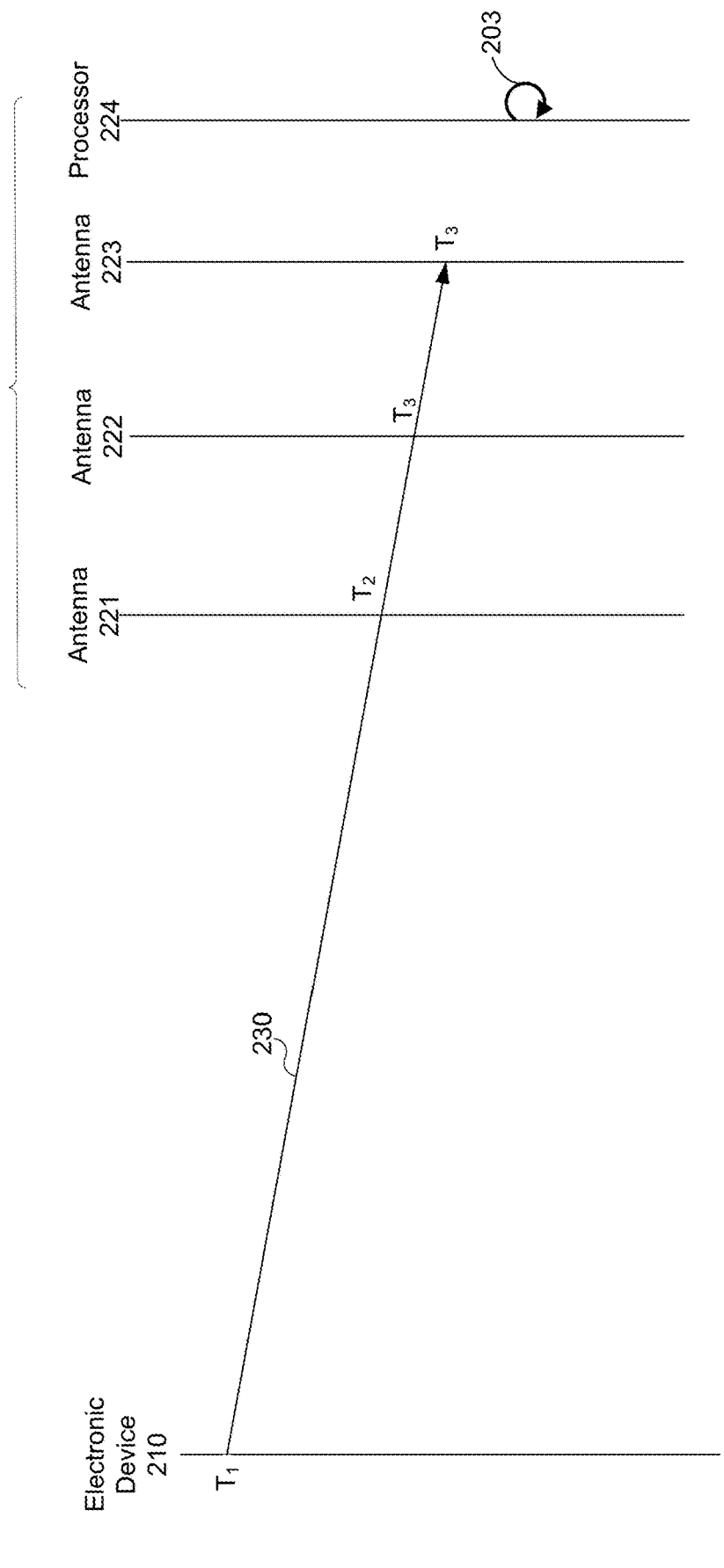
FIG. 2 illustrates a sequence diagram involving a primary device (referred to as a transmitting device or beacon) and a receiving device with a multiple-antenna array.

FIG. 2 shows a sequence diagram 200 of a ranging operation involving an initiating electronic device 210 and a mobile device 220 having three antennas 221, 222, and 223 according to embodiments of the present disclosure. Antennas 221, 222, 223 can be arranged to have different orientations, e.g., to define a field of view for calculating angle of arrival or for performing ranging measurements.

In this example of FIG. 2, each of antennas 221, 222, 223 receives a packet (including one or more pulses) that is transmitted by the initiating electronic device 210 (e.g., an electronic tag). The mobile device 220 can have multiple antennas, which can be used to determine angular information related to an orientation of mobile device 220 relative to electronic device 210. The electronic device 210 can transmit a ranging request 230 at time $T_1$. The ranging request 230 can travel at the speed of light. The ranging request 230 can be received at times $T_2$, $T_3$, and $T_4$, by antennas 221, 222, and 223 respectively. Thus, the RF antenna(s) (e.g., UWB antennas) of mobile device 220 can listen at substantially the same time. In various embodiments, each of the antennas 221, 222, and 223 can respond independently.

Processor 224 of mobile device 220 can calculate an angle of arrival to the electronic device 210. Processor 224 can receive the time of arrival of the packets from the antennas 221, 222, and 223. The mobile device 220 RF circuitry (e.g., UWB circuitry) can analyze the received signals from antennas 221, 222, 223. As described later, processor 224 can be an always-on processor that uses less power than an application processor that can perform functionality that is more general. The processor 224 can know the geometry of the three antennas on the phone. The processor 224 can also know the orientation of the mobile device 220 from one or more sensors on the mobile device 220 (e.g., accelerometer, gyroscope, and compass). With the known orientation of the antennas 221, 222, and 223, and the known orientation of the mobile device 220, the processor can use the times of arrival $T_2$, $T_3$, and $T_4$ to calculate an angle of arrival of the ranging request 230 to the initiating electronic device 210.

Accordingly, a mobile device 220 can have multiple antennas to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian, or polar, where polar coordinates can comprise an angular value and a radial value.

Figure 3:
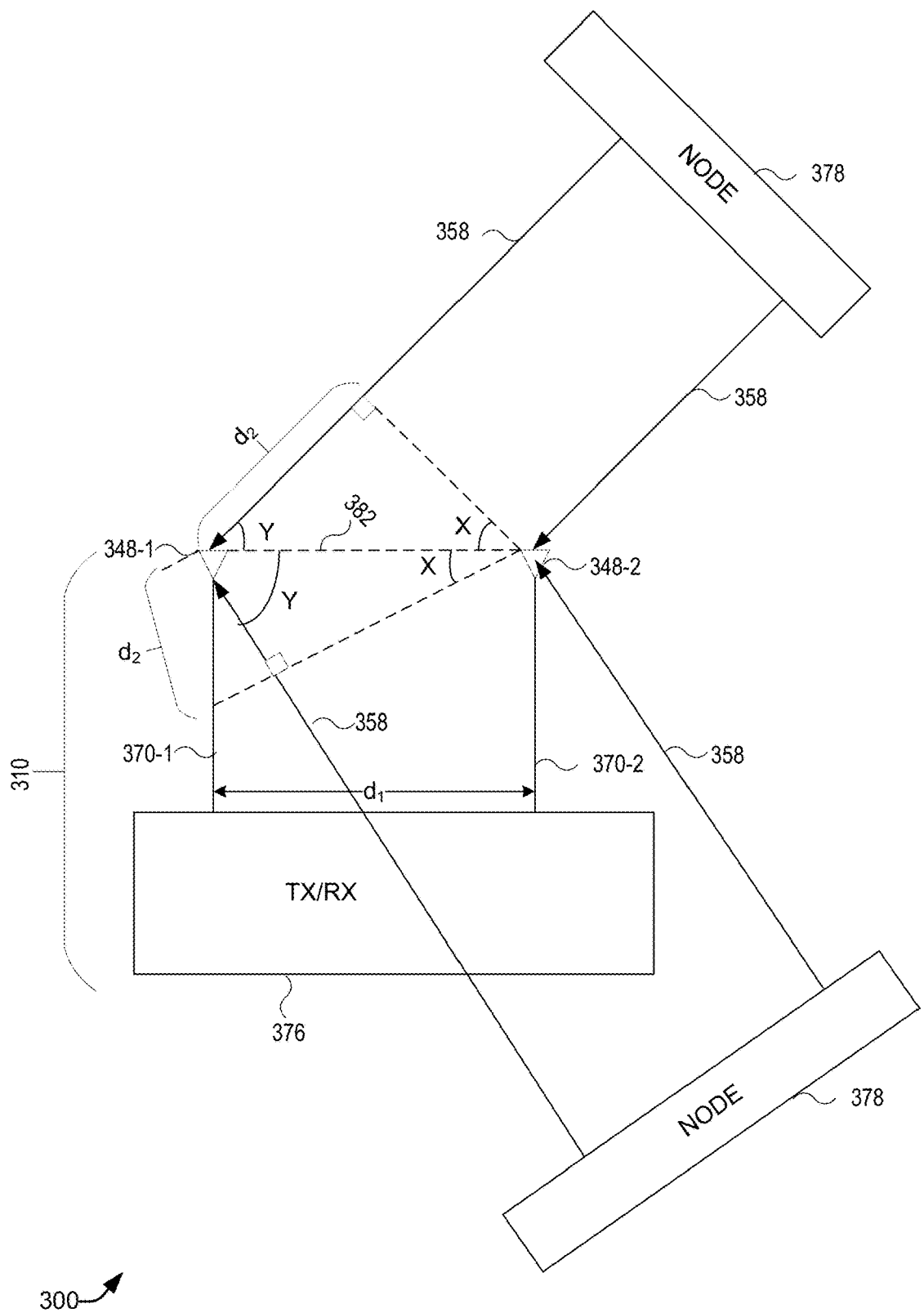
FIG. 3 is a schematic diagram showing how angle of arrival measurement techniques may be used to determine the orientation of mobile device relative to an electronic device.

FIG. 3 is a schematic diagram 300 showing how angle of arrival measurement techniques may be used to determine the orientation of device 310 relative to nodes 378. The term "node" may be used to refer to an electronic device, an object without electronics, and/or a particular location. In some arrangements, nodes may be associated with a mapped environment (e.g., the term node may refer to a device, object, or location in a mapped environment). Devices 310 may have control circuitry that determines where other nodes are located relative to device 310. The control circuitry in device 310 may synthesize information from cameras, motion sensors, wireless circuitry such as antennas, and other input-output circuitry to determine how far a node is relative to device 310 and/or to determine the orientation of device 310 relative to that node. The control circuitry may use output components in device 310 to provide output (e.g., display output, audio output, haptic output, or other suitable output) to a user of device 310 based on the position of the node. The control circuitry may, for example, use antenna signals and motion data to determine the angle of arrival of signals from other electronic devices to thereby determine the locations of those electronic devices relative to the user's electronic device.

As shown in FIG. 3, device 310 may include multiple antennas (e.g., a first antenna 348-1 and a second antenna 348-2) coupled to transceiver circuitry 376 by respective transmission lines 370 (e.g., a first transmission line 370-1 and a second transmission line 370-2). Antennas 348-1 and 348-2 may each receive a wireless signal 358 from node 378. Antennas 348-1 and 348-2 may be laterally separated by a distance $d_1$, where antenna 348-1 is farther away from node 378 than 348-2 (in the example of FIG. 3). Therefore, wireless communications signal 358 travels a greater distance to reach antenna 348-1 than 348-2. The additional distance between node 378 and antenna 348-1 is shown in FIG. 3 as distance $d_2$. FIG. 3 also shows angles x and y (where x+y=90°).

Distance $d_2$ may be determined as a function of angle γ or angle x (e.g., $d_2=d_1 \sin(x)$ or $d_2=d_1 \cos(y)$). Distance $d_2$ may also be determined as a function of the phase difference between the signal received by antenna 348-1 and the signal received by antenna 348-2 (e.g., $d_2=(\Delta\phi\lambda)/(2\pi)$, where $\Delta\phi$ is the phase difference between the signal received by antenna 348-1 and the signal received by antenna 348-2 and λ is the wavelength of the received signal 358). Device 310 may have phase measurement circuitry coupled to each antenna to measure the phase of the received signals and identify a difference in the phases ($\Delta\phi$). The two equations for $d_2$ may be set equal to each other (e.g., $d_1 \sin(x)=(\Delta\phi\lambda)/(2\pi)$) and rearranged to solve for angle x (e.g., $x=\sin^{-1}(\Delta\phi\lambda)/(2\pi d_1)$) or may be rearranged to solve for angle γ. As such, the angle of arrival may be determined (e.g., by control circuitry) based on the known (predetermined) distance between antennas 348-1 and 348-2, the detected (measured) phase difference between the signal received by antenna 348-1 and the signal received by antenna 348-2, and the known wavelength or frequency of the received signals 358.

Distance $d_1$ may be selected to ease the calculation for phase difference between the signal received by antenna 348-1 and the signal received by antenna 348-2. For example, $d_1$ may be less than or equal to one-half of the wavelength (e.g., effective wavelength) of the received signals 358 (e.g., to avoid multiple phase difference solutions).

Some antenna arrangements may be sufficient for resolving the "complete" angle of arrival of signals 358 without ambiguity. A complete angle of arrival (sometimes referred to as the direction of arrival) includes an azimuth angle θ and an elevation angle γ of node 378 relative to device 3.

Antennas that are located in a three-dimensional arrangement (e.g., spanning multiple planes) may be sufficient to determine the complete angle of arrival of signals 358 without ambiguity. However, when the baseline vectors (i.e., the vectors that extend between respective pairs of antennas) are all located in one plane, there may be some ambiguity as to the correct azimuth angle θ and/or the correct elevation angle γ of signals 358. In the two-antenna arrangement of FIG. 3, for example, there is only one baseline vector 382, which yields an accurate, unambiguous azimuth angle θ, but may not provide sufficient information to determine elevation angle φ. Thus, node 378' with a different elevation angle may nonetheless produce signals 358' with the same phase difference $\Delta\phi$ between the signal received by antenna 348-1 and the signal received by antenna 348-2 as signals 358. In other words, different directions of arrival may result in the same phase difference. This leads to an ambiguity in the angle of arrival solution. Without other information, control circuitry may be able to determine the azimuth angle θ of signals 358 but may be unable to determine elevation angle γ of signals 358. Systems with three or more coplanar antennas will resolve some but not all ambiguities in the angle of arrival because the baseline vectors will still be located in the same plane.

To help resolve ambiguities in the complete angle of arrival, control circuitry may combine antenna signals with motion data gathered using motion sensor circuitry. In particular, control circuitry may obtain angle of arrival measurements (e.g., measurements of azimuth angle θ and/or elevation angle φ) while device 310 is in multiple different positions. At each position, antennas 348 may receive signals 358 from node 378 and control circuitry may determine the possible angle of arrival solutions based on the phase difference between signals received by antenna 348-1 and signals received by antenna 348-2. Motion sensor circuitry may track the movement of device 310 as it is moved from one position to another. Using the motion data from motion sensor circuitry, control circuitry may associate each set of angle of arrival solutions with a different baseline vector 382. The baseline vectors may span multiple planes, thus providing sufficient information for control circuitry to determine the correct angle of arrival, just as if device 310 had a multi-planar antenna arrangement.

It should be understood that using a horizontal coordinate system and representing the complete angle of arrival with azimuth and elevation angles is merely illustrative. If desired, a Cartesian coordinate system may be used and the angle of arrival may be expressed using a unit direction vector that is represented using x, y, and z coordinates. Other coordinate systems may also be used. A horizontal coordinate system is sometimes described herein as an illustrative example.

C. Low Energy Protocols

As described above, electronic device can transmit a timing signal via a wireless protocol (e.g., Bluetooth Low Energy (BLE) advertising). One of the advantages of BLE is lower power consumption even when compared to other low power technologies. BLE achieves the optimized and low power consumption by keeping the radio off as much as possible and sending small amounts of data at low transfer speeds. Another advantage of BLE is that it is enabled in most smartphones in the market.

One of the limitations of BLE is limited data throughput. The data throughput of BLE is limited by the physical radio layer (PHY) data rate, which is the rate at which the radio transmits data. This rate depends on the Bluetooth version used. For Bluetooth 4.2 and earlier, the rate is fixed at 1 megabits per second (Mbps). For Bluetooth 5 and later, however, the rate varies depending on the mode and PHY used. The rate can be 1 Mbps like earlier versions, or 2 Mbps when utilizing the high-speed feature. Another limitation of BLE is the limited range. Bluetooth Low Energy (and Bluetooth in general) was designed for short-range applications and hence the range of operation is limited. There are a few factors that limit the range of BLE. The factors include that BLE operates in the 2.4 GHz Industrial, Scientific, and Medical (ISM) spectrum which is greatly affected by obstacles that exist all around us such as metal objects, walls, and water (especially human bodies). Other factors include performance and design of the antenna of the BLE device, physical enclosure of the device, and device orientation.

BLE requires a gateway for Internet connectivity. In order to transfer data from a BLE-only device to the Internet, another BLE device that has an IP connection is needed to receive this data and then, in turn, relay it to another IP device (or to the Internet).

In the advertising state, a device sends out packets containing useful data for others to receive and process. The packets are sent at a fixed interval defined as the Advertising Interval. The interval can be random or pseudo-random. There are 40 radio frequency (RF) channels in BLE, each separated by 2 MHz (center-to-center). Three of these channels are called the Primary Advertising Channels, while the remaining 37 channels are used for Secondary Advertisements and for data packet transfer during a connection. A central device discovers BLE peripherals and broadcasters with the capability of connecting to peripheral devices. Advertisements can start with advertisement packets sent on the three Primary Advertising Channels (or a subset of these channels). This allows central devices to find the Advertising device (Peripheral or Broadcaster) and parse its advertising packets. The central device can then initiate a connection if the advertiser allows it (e.g., peripheral devices).

D. Ultra-Wideband Packet Transmissions

Ultra-Wide Band (UWB) transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging for the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 megahertz (MHz). Bluetooth defines two transmission types: data and advertising transmissions. As such, three of these 40 channels are dedicated to advertising and 37 dedicated to data. Advertising allows devices to broadcast information defining their intentions.

The UWB information packets can be structured to transmit at a specific time relative to the transmitting device's BLE advertisements. Accordingly, the receiving device can listen for the UWB packets at an expected time or during an expected time window around the expected time. The UWB packets can convey transmitting device information, deep links, and/or transmission time information. The receiver device can use the time in the BLE advertising message to determine when to listen for the next poll. The UWB packets can be transmitted in the UWB frequency range.

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the RF ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz, another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates to which stage the message corresponds, e.g., ranging requests can correspond to stage 1 and ranging responses can correspond to stage 2. Such use of an indicator may be helpful when more than two devices are performing ranging operations near each other.

The narrow pulses (e.g., ~ one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

Mobile devices may use Global Navigation Satellite Systems (GNSS) (e.g., Global Positioning System (GPS)) or other location circuitry to determine the location of the mobile device. For example, a map application can show an approximate location of the mobile device on a map. However, such techniques for determining location are typically determined relative to some external reference frame that is fixed, and not to a variable reference frame, e.g., another mobile device. Additionally, GNSS systems can be limited indoors or in areas of blocked signals (e.g., dense urban environments) or suffer from inaccuracies from reflected signals. Further, the standard accuracy for GPS systems is currently 4 meters for horizontal accuracy and worse for vertical accuracy. Enhanced communication techniques can allow for information exchanges that allow for angular determination, ranging, and information exchanges between electronic devices.

II. Localization Techniques

Various techniques can be used to determine a location of an electronic device in a geographic based reference system. Global Navigation Satellite System (GNSS) is a broad term encompassing different types of satellite-based positioning, navigation and timing (PNT) systems used globally. Global Positioning System (GPS) can be one such type of Global Navigation Satellite System. Sometimes GPS signals are not accurate because of obstacles to signals like buildings, trees and sometimes by extreme atmospheric conditions like geomagnetic storms. GPS does not penetrate solid walls or structures. Therefore, there are certain conditions (e.g., indoors, under heavy foliage cover, and in underground structures) that can utilize other localization techniques.

Electronic devices can communicate with each other using wireless RF communication techniques (e.g., UWB ranging, received signal strength indication (RSSI), Wi-Fi signal strength) to generate a local coordinate system between the devices that does not rely on any fixed infrastructure. If one of the devices may be able to generate a real-world fix (e.g., using GNSS information), the information can be shared with the other devices in the peer-to-peer network. For example, if a group of hikers each of an electronic device (e.g., a smartphone or a wearable device), the electronic devices can generate a local coordinate system. If one of the electronic devices of the group can acquire GNSS information (e.g., in a clearing) then that information can be shared with the other electronic devices in the peer-to-peer communication network.

Triangulation techniques can include an electronic device receiving signals from various electronic devices. The signals can be used to calculate a range between the electronic devices. The intersection of range circles can be used to determine a position of the electronic device in a local coordinate system.

A. Two Antenna Techniques

Electronic devices can include various wireless antenna for receiving wireless signals. The antenna can be located at different positions and orientations on the electronic device. The antenna can receive a wireless signal at different times at each antenna based on the position and orientation of the antenna with respect to the transmitting device. The different reception times can be used to determine ranges between the transmitting device and the receiving device.

Figure 4:
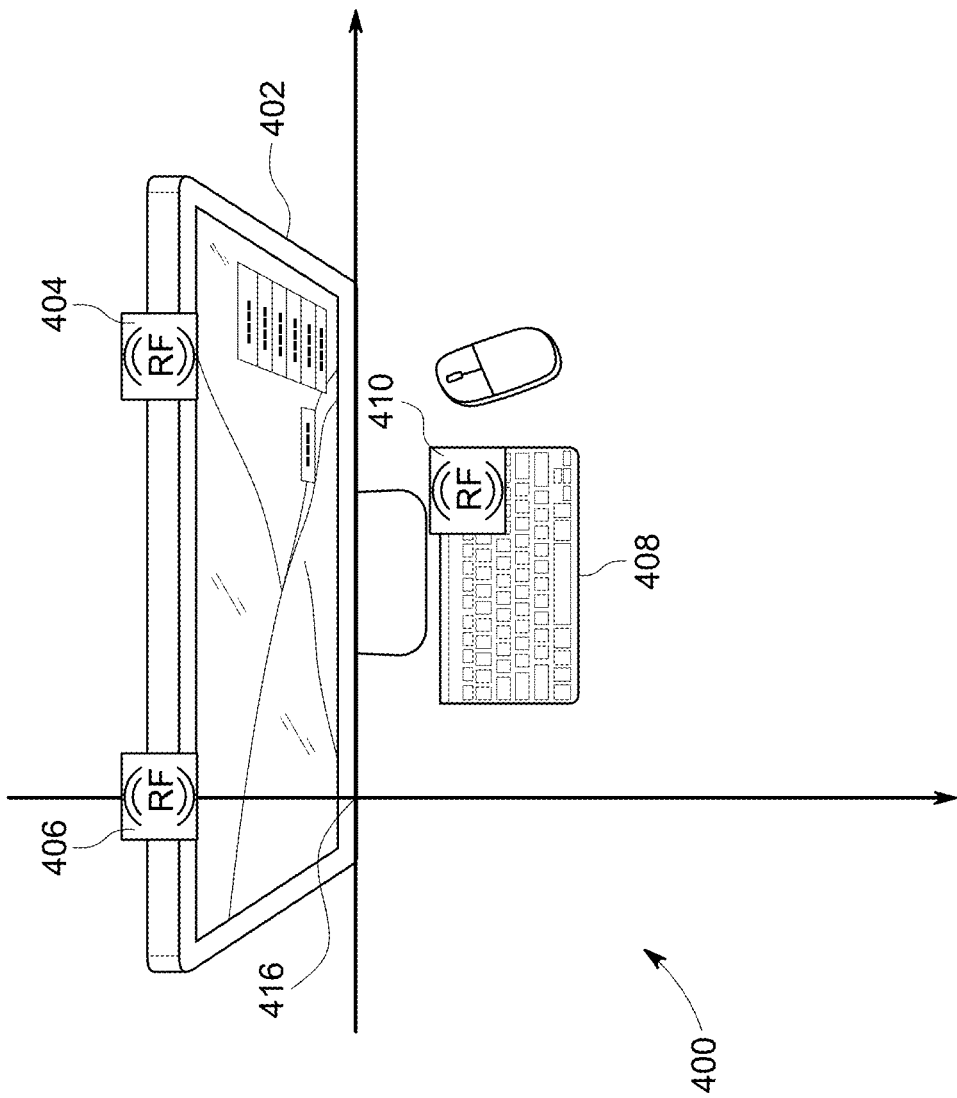
FIG. 4 illustrates an exemplary device map of a computing device with two antenna.

FIG. 4 illustrates an exemplary device map 400 including a computing device 402 with a display. A first wireless antenna 404 and a second wireless antenna 406 can be incorporated in the computing device 402. As illustrated in FIG. 4 the first wireless antenna 404 and the second wireless antenna 406 can be located at different positions on the computing device 402. The first wireless antenna 404 and the second wireless antenna 406 can be installed at various orientations on the computing device 402. An accessory 408 can incorporate a wireless antenna (e.g., third wireless antenna 410). The third wireless antenna 410 can be located in any position or orientation on the accessory 408. In various embodiments, the accessory 408 can be a keyboard (e.g., a wireless keyboard). In various embodiments, the accessory 408 can be one of a pointing device, a camera, or a microphone.

The device map 400 of FIG. 4 illustrates how the devices can be mapped using Cartesian coordinates. For example, FIG. 4 illustrates an x-axis 412 and a y-axis. Devices can be mapped with respect to an origin 416 in the device map 400. In various embodiments, an origin can be a position of an antenna.

Figure 5:
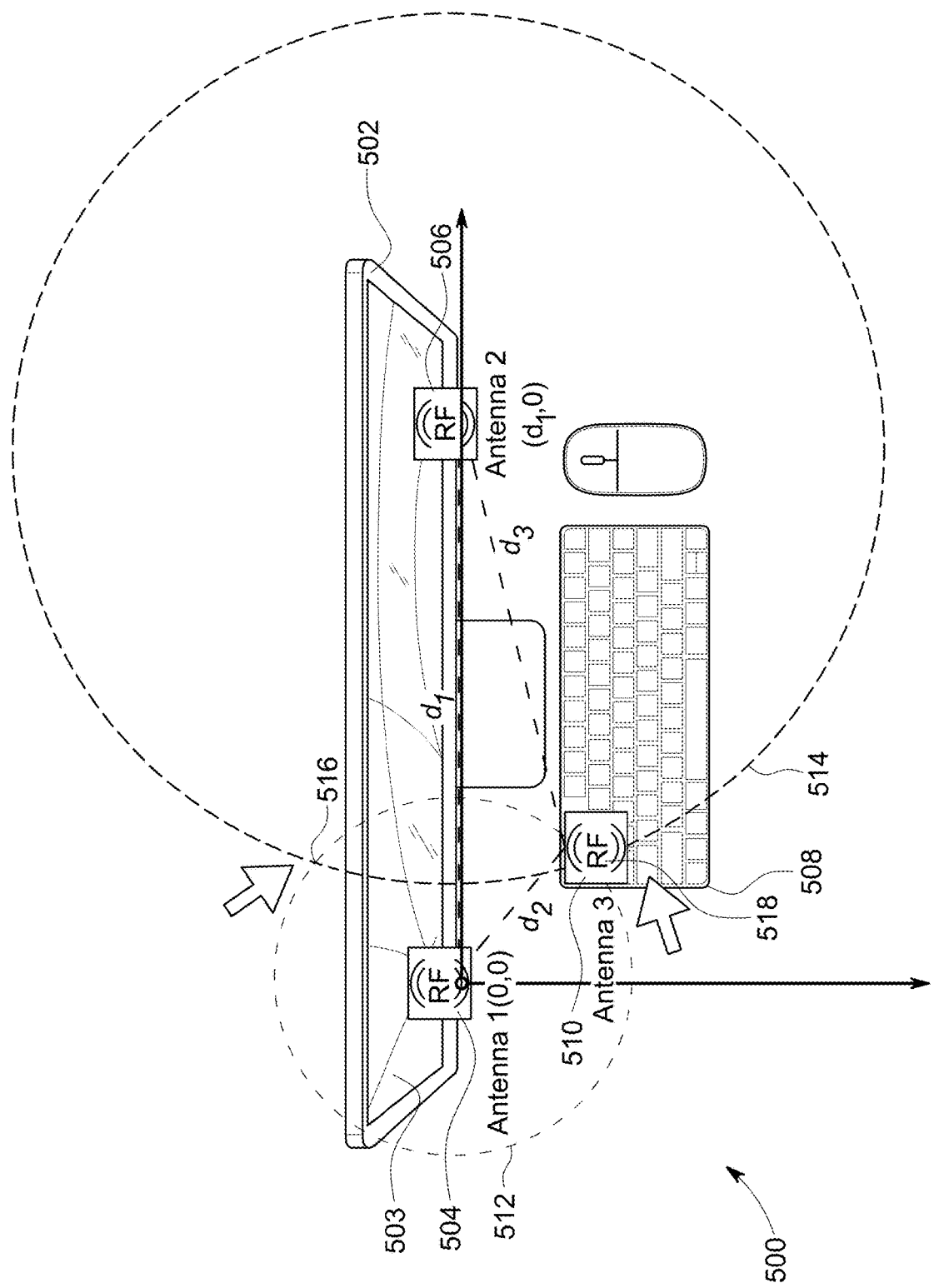
FIG. 5 illustrates an exemplary device map illustrating ranging ambiguity for the computing device of FIG. 4.

FIG. 5 illustrates a device map 500 to illustrate ranging ambiguity for the computing device of FIG. 4. FIG. 5 illustrates an exemplary computing device 502 with a first wireless antenna 504 and a second wireless antenna 506. As illustrated in FIG. 5, the first wireless antenna 504 and the second wireless antenna 506 are located at different positions on the computing device 502. An accessory 508 can incorporate a wireless antenna (e.g., third wireless antenna 510). The accessory 508 can be a keyboard. In various embodiments, an accessory can be an electronic device used by the user (e.g., a wearable device).

The first wireless antenna 504 can be located at a first location (e.g., located at position (0,0)). In various embodiments, the first location can be the origin for a local coordinate system. The second wireless antenna 506 can be located at a second location (e.g., located at position $(d_1, 0)$). In this case, the second location can be an indicator as to the location of an x-axis in the local coordinate system. The location between the first wireless antenna 504 and the second wireless antenna can be specified by distance $d_1$, that can be determined by hardware specifications Various other electronic devices can be mapped into the local coordinate system based on the positions relative to the origin (e.g., the first location).

The first wireless antenna 504 can receive a wireless signal from a transmitting device. In various embodiments, the time-of-flight for the wireless signal can be measured using a three-packet exchange (e.g., ping-pong-ping). For example, a transmitting device can transmit a wireless signal (ping), the electronic device can receive the signal and transmit a response signal (pong). The transmitting device can receive the response signal and transmit an acknowledgement message (ping). The elapsed time between the transmission of the response signal (pong) and the reception of the acknowledgement message (ping) less any processing times can be used to determine a roundtrip time of flight. The one-way time-of-flight ($t_1$) can be the roundtrip time of flight divided by two. The one-way time-of-flight $t_1$ can be converted to a range or distance ($d_2$) as the velocity of the signal is known as electromagnetic signals travel at the speed of light (c). The formula can be:

$$d_2 = t_1 * c$$

Another technique for estimating a range from a transmitting device to a mobile device can include measuring signal strength of a signal received from the transmitting device. A response signal may be transmitted from a wireless network element to a mobile device in response to a probe request, as discussed above, and a strength of such a response signal may be measured. Based on such a measured signal strength, the range from the mobile device to a transmitting device may be estimated. The transmitting device may periodically broadcast a signal, and a strength of such a received broadcast signal may be measured at the mobile device. In one implementation, the transmitting device may transmit signals at a known signal strength. In a location with no obstructions, for example, a strength of a signal transmitted from the transmitting device may decrease at a known rate over a given range. For example, if a signal strength of a received signal is 80% of the strength at which such a signal is transmitted by a wireless network element, a mobile device may estimate a range to the transmitting device to be 100 meters in one example implementation. In a second example, if a signal strength of a received signal is measured to be 82% of the strength at which such a signal is transmitted by a transmitting device, a mobile device may estimate a range to the transmitting device to be 91 meters in one example implementation. Signal strength may decrease at a known rate over distance and, based on the measurement of signal strength of a signal received from the transmitting device, a range from a mobile device to the transmitting device may be estimated. A calibration can be performed that correlates a measured signal strength with a range to the transmitting device. Using this technique, a measured signal strength can be used to determine distance ($d_2$).

The distance ($d_2$) can be a radius of a first range circle 512.

The second wireless antenna 506 can receive a wireless signal after a transmission time $t_2$. The transmission time $t_2$ can be converted to a range or distance ($d_1$) as the velocity of the signal is known as electromagnetic signals travel at the speed of light (c). The formula can be:

$$d_3 = t_2 * c$$

The distance ($d_3$) can be a radius of a second range circle 514.

The location of a transmitting device can be determined by the intersection of the first range circle 512 and the second range circle 514. Under certain conditions, the first range circle 512 and the second range circle 514 can intersect at a first intersection point 516 and a second intersection point 518. As there are two potential locations of the transmitting device (e.g., it can be located at the first intersection point 516 and the second intersection point 518), there can be some ambiguity in the actual location of transmitting device.

One technique to resolve the ambiguity of the location of the transmitting device is to use information on the transmitting device itself to determine a logical position of the transmitting device. In one example, the transmitting device can be a third wireless antenna 510. The transmitting device can be an accessory 508. The accessory 508 can be a keyboard. If the system knows the orientation of a display 503 (e.g., a face of the display 503) of the computing device 502. Additional information can include a type of device for the transmitting device. The additional information can be stored in a memory of the computing device 502. For example, the computing device 502 can accession the information stored in the memory that identifies the type of device as a keyboard. Potential location information for the transmitting device can also be stored in a memory based on the type of the device. For example, a keyboard can normally be located in-front of the display 503. The stored location information can be used to infer an accurate location of the transmitting device between the first intersection point 516 and the second intersection point 518. For example, it would be more logical for the keyboard to be located in front of a face of the display 503 as opposed to behind the display 503

B. Three or More Antenna Techniques

An electronic device can incorporate three of more wireless antenna. The wireless antenna can be distributed at different locations and different orientations on the computing device. The different locations and different orientations allow for receipt of wireless signals at different times. The three or more antenna techniques do not rely on any knowledge about the type of a device for the transmitting device.

Figure 6:
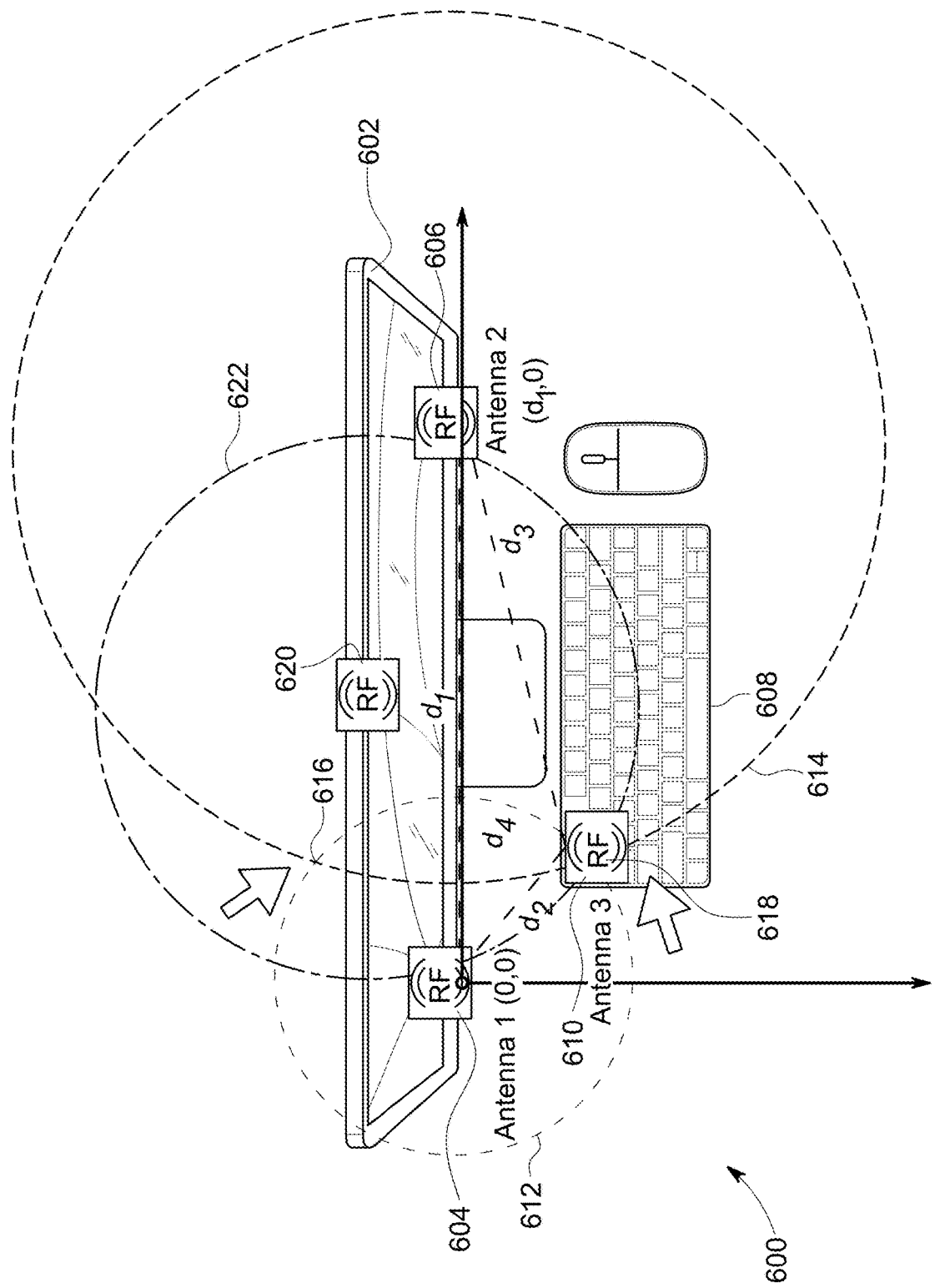
FIG. 6 illustrates an exemplary device map of a computing device with three antenna.

FIG. 6 illustrates a technique for locating an electronic device using the computing system of FIG. 4 with three wireless antennae. FIG. 6 illustrates an exemplary device map 600 with a computing device 602 with a first wireless antenna 604, a second wireless antenna 606, and a third wireless antenna 620. As illustrated in FIG. 6 the first wireless antenna 604, the second wireless antenna 606, and the third wireless antenna 620 can be located at different positions on the computing device 602. An accessory 608 can incorporate a wireless antenna (e.g., a fourth wireless antenna 610). The accessory 608 can be a keyboard.

Using the techniques described above for FIG. 5, a first range circle 612 can be determined from the first range $d_2$ and a second range circle 614 can be determined from the second range $d_3$. Having a third wireless antenna 620 allows the computing device 600 to generate a third range circle 622 using the fourth range $d_4$. The intersection of the first range circle 612, the second range circle 614, and the third range circle 622 can be the location of the transmitting device. In this was no inferences are necessary as with the two antenna techniques.

Although FIG. 6 illustrates three antennae, these techniques are not limited to using only three antennae. Four or more antennae can also be used. The increased number of antennae can improve the preciseness of the location determination. The location of the transmitting device can be at the intersection of the range circles generated by the reception times of the wireless signals.

C. Flow Diagram

FIG. 7 is a flow chart of a process 700, according to an example of the present disclosure. According to an example, one or more process blocks of FIG. 7 may be performed by an electronic device (e.g., the computing device 502 as shown in FIG. 5).

At block 705, process 700 may include performing, using the first antenna, a first range measurement with a second electronic device to obtain a first circle of possible positions of the second electronic device. For example, the electronic device may perform, using the first antenna, a first range measurement with a second electronic device to obtain a first circle of possible positions of the second electronic device, as described above.

The electronic device can conduct ranging with a second electronic device (e.g., a transmitting device). The first antenna can receive wireless signals from a transmitting device. The electronic device can receive one or more wireless signals from the second electronic device. The electronic device can determine a range between the electronic device and the second electronic device using one or more techniques (e.g., determining received signal strength, measuring time from transmission of the signal to reception of the signal, or measuring round trip time while accounting for processing time). The wireless signals can include identifying information for the second electronic device and or the first electronic device. In this way, the electronic device can identify a source of the wireless transmissions. The wireless signals can also include other information packets that can be used for determining a range between the electronic device and the second electronic device. The other information packets can include processing/turnaround times, calculated range, or round-trip time information, etc.

The range between the electronic device and the second electronic device can be converted to a first circle (e.g., a range circle) centered around the electronic device. The second electronic device can be located at a position along the circumference of the range circle. One or more of the time information, the signal strength information, the range information, and the range circle information can be stored in a memory of the electronic device.

The first antenna can receive wireless signals. In various embodiments, the first antenna can receive RF (e.g., UWB) signals. In various embodiments, the first wireless antenna can receive Wi-Fi signals.

At block 710, process 700 may include performing, using the second antenna, a second range measurement with the second electronic device to obtain a second circle of possible positions of the second electronic device, where the first antenna is at a same vertical height as the second antenna. For example, electronic device may perform, using the second antenna, a second range measurement with the second electronic device to obtain a second circle of possible positions of the second electronic device, where the first antenna is at a same vertical height as the second antenna, as described above.

The electronic device can conduct ranging with a second electronic device (e.g., a transmitting device). The second antenna can receive wireless signals from the transmitting device. In various embodiments, the second antenna can receive RF (e.g., UWB) signals or Wi-Fi signals. The electronic device can receive one or more wireless signals from the second electronic device. The electronic device can determine a range between the electronic device and the second electronic device using one or more techniques (e.g., determining received signal strength, measuring time from transmission of the signal to reception of the signal, or measuring round trip time while accounting for processing time). The wireless signals can include identifying information for the second electronic device and or the first electronic device. In this way, the electronic device can identify a source of the wireless transmissions. The wireless signals can also include other information packets that can be used for determining a range between the electronic device and the second electronic device. The other information packets can include processing/turnaround times, calculated range, or round-trip time information, etc.

The range between the electronic device and the second electronic device can be converted to a second circle (e.g., range circle) centered around the electronic device. The second electronic device can be located at a position along the circumference of the range circle. One or more of the time information, the signal strength information, the range information, and the range circle information can be stored in a memory of the electronic device.

In various embodiments, at least one of the first range measurement and the second range measurement between the first range measurement and the second range measurement is calculated by measuring a round trip time of a wireless signal.

At block 715, process 700 may include determining two potential locations of the second electronic device based on an intersection of the first circle and the second circle. For example, electronic device may determine two potential locations of the second electronic device based on an intersection of the first circle and the second circle, as described above. As described above in description for FIG. 5, the first circle and the second circle may intersect at two points. These two points can be the two potential locations for the location of the transmitting device.

At block 720, process 700 may include determining a type of device for the second electronic device. For example, electronic device may determine a type of device for the second electronic device, as described above.

For example, the type of the device can be an accessory that intuitively would be in front of the device (e.g., a keyboard, a pointing device). In various embodiments, the type of device can be a wireless keyboard. The type can be determined from information (e.g., an identifier of the transmitting device) embedded in the wireless signals from the transmitting device.

At block 725, process 700 may include determining an actual location of the second electronic device between the two potential locations based on the type of device for the second electronic device. For example, electronic device may determine an actual location of the second electronic device between the two potential locations based on the type of device for the second electronic device, as described above.

For example, if the type of the device is an accessory that would normally be on a certain side of the computing device, that information can be used to resolve the ambiguity. For example, if the type is a keyboard which would normally be positioned in from of a display for the computing device, that inference can be used to resolve the ambiguity. The electronic device can utilize the identifier to determine the type of the device.

In various embodiments, process 700 can include generating a local coordinate system that includes a first location of the first electronic device and the actual location of the second electronic device. The process can include storing the local coordinate system within a memory of the electronic device.

In various embodiments, process 700 can include performing, using the first antenna, a third range measurement with a third electronic device to obtain a third circle of possible positions of the third electronic device. The process 700 can include performing, using a third antenna, a fourth range measurement with the third electronic device to obtain a fourth circle of possible positions of the third electronic device. The process 700 can include determining a location of the third electronic device within the local coordinate system based on an intersection of the third circle and the fourth circle.

In various embodiments, the third electronic device has established a geographic location, process 700 can further include determining a first geographic location for the first device and a second geographic location of the second device based on the location of the third electronic device within the local coordinate system. For example, if the third device has established a location in a global reference frame (e.g., using a GNSS signal), that information can be shared with the other electronic devices. The other electronic devices can use their relative position the third device, It should be noted that while FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

D. Use Cases

The location determination techniques can be used in various scenarios of limited or unreliable GNSS information. Such scenarios can include outdoor areas in woods under heavy canopy from foliage. These techniques can also be used urban areas in which tall buildings can make the GNSS signals unreliable. These techniques can also be used in-doors or in underground locations (e.g., basements and garages) in which the GNSS signals may be unavailable.

In other cases, the location determination techniques can be used in for a ride sharing company in parking facilities in which there is no GNSS signals (e.g., underground or in urban environments). In those cases, the devices can establish a local coordinate system between the rider and the driver/vehicle just without relying on global location information. In this way, the peer-to-peer local communications network be used to determine a position of a rider that may have no GNSS signal. One of the devices in the peer-to-peer network may have GNSS information and that GNSS information can be combined with the relative location information to determine a global position. In this way, the mobile device of the rider can transmit an accurate global position to the driver's mobile device even if the rider's mobile device cannot receive GNSS signals.

In other cases, a restaurant, a bar, a cafe, or sporting events venue can use the location determination techniques to deliver food or drinks to the patrons without the need for GNSS signals. Just as with the ride sharing scenario, users may not be able to receive GNSS signals in the venue. Multiple electronic devices can form a peer-to-peer local communications network that can determine relative positions of the multiple electronic devices in the venue. Servers can use mobile devices III. Transforming Independent Coordinate Systems Electronic devices can conduct ranging between compatible devices. The information determined from ranging sessions can be used to map a local coordinate system. The local coordinate system can provide locations of the devices with respect to a point (e.g., an origin). The local coordinate system does not rely on a global reference system e.g., GNSS system.

A. Description of Coordinate Systems

Figure 8:
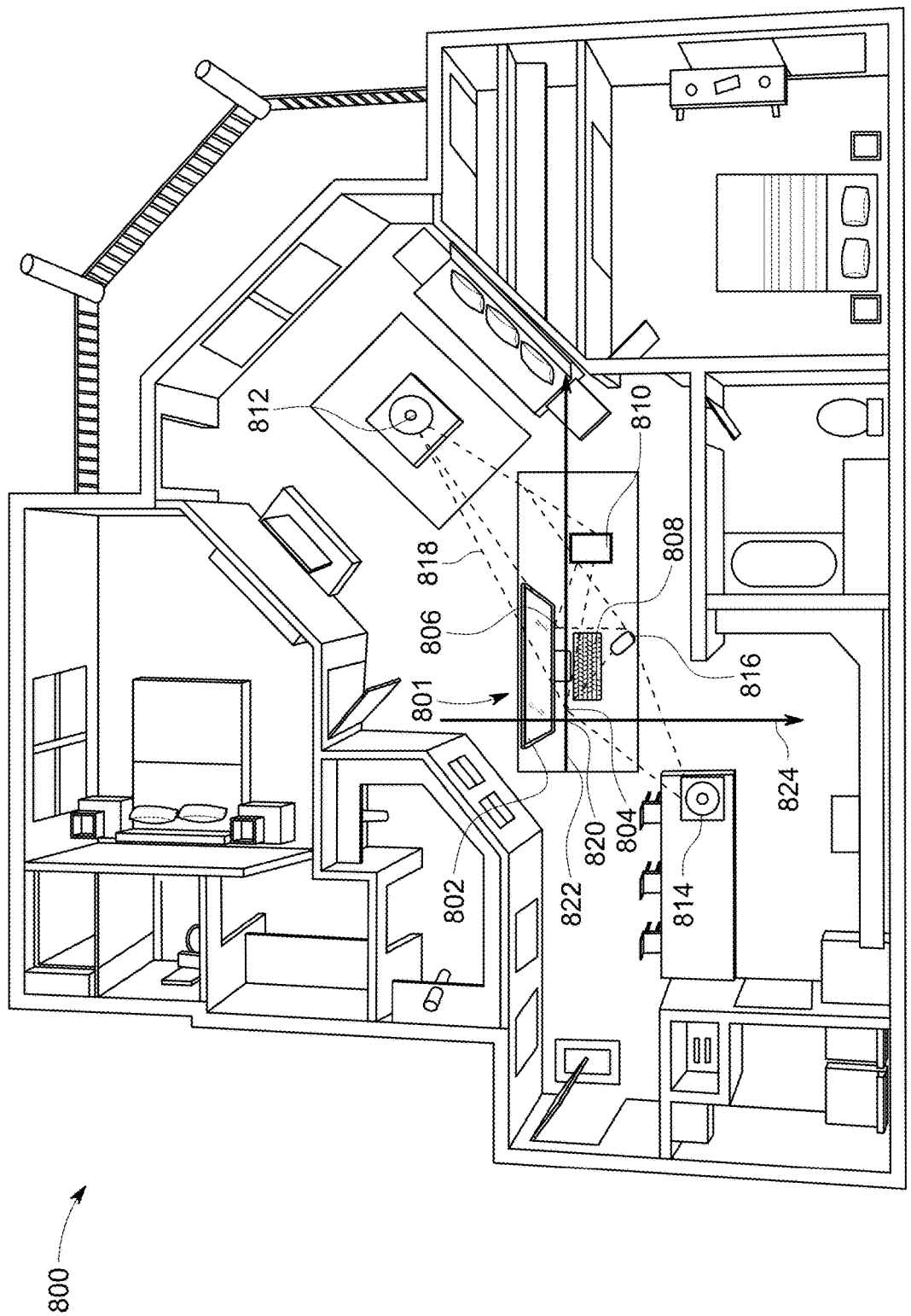
FIG. 8 illustrates a diagram for mapping various electronic devices into a coordinate system.

FIG. 8 illustrates a diagram for mapping various electronic devices into a local coordinate system. FIG. 8 illustrates a home setting, but the techniques described herein are not so limited. A local coordinate system can be an office, an outside location (e.g., a ballpark), a concert venue, etc. FIG. 8 illustrates a local coordinate system 800 having a computing device 801 with a monitor 802. A first wireless antenna 804 and a second wireless antenna 806 can be located on the first computing device 801, e.g., located on the monitor 802. As illustrated in FIG. 8 the first wireless antenna 804 and the second wireless antenna 806 are located at different positions on the monitor 802 of the computing device 801.

FIG. 8 illustrates other electronic devices. For example, FIG. 8 illustrates an accessory 808 (e.g., a wireless keyboard). FIG. 8 also illustrates a tablet computer 810, a first smart speaker 812, a second smart speaker 814, and a mobile device 816. Wireless signals 818 can be used to conduct ranging between the electronic devices. The ranging can include measuring a time-of-flight of wireless signals 818 between the electronic devices. As the wireless signals travel at the speed of light, a range between the electronic devices can be determined by multiplying a time-of-flight times the speed of light. In various embodiments, one device can receive the time-of-flight information and calculate range information to one or more electronic devices in the local communication network. The one device can communicate the calculated range information to one or more electronic devices in the local communication network. In various embodiments, each of the one or more electronic devices can calculate and store the range information between the various electronic devices.

In various embodiments, the received signal strength information from the wireless signals can be measured. The received signal strength information can relate to a particular range between the transmitting device and the receiving device. In various embodiments, one device can receive the RSSI and calculate the range information. The one device can communicate the calculated range information to one or more electronic devices in the local communication network. In various embodiments, each of the one or more electronic devices can calculate and store the range information between the various electronic devices.

he wireless signals 818 can generate a range between each of the electronic devices and the devices can be plotted with respect to each other in a local coordinate system 800.

The local coordinate system can include an origin 820 in which an x-axis 822 and ay-axis 824 cross. The electronic devices can be mapped with respect to the x-axis 822 and ay-axis 824.

B. Using Electronic Device to Transform Independent Coordinate Systems

Some locations can require multiple, independent coordinate systems for coverage of an environment (e.g., a residence, a business, a venue, etc.) because different local systems can be too far away from each other. The electronic devices located in each coordinate system can be mapped to respective coordinate systems based on their location. At times it may be useful to transform the independent coordinate systems into one global coordinate system. Multiple coordinate systems can be used to connect all devices throughout the environment.

Figure 9:
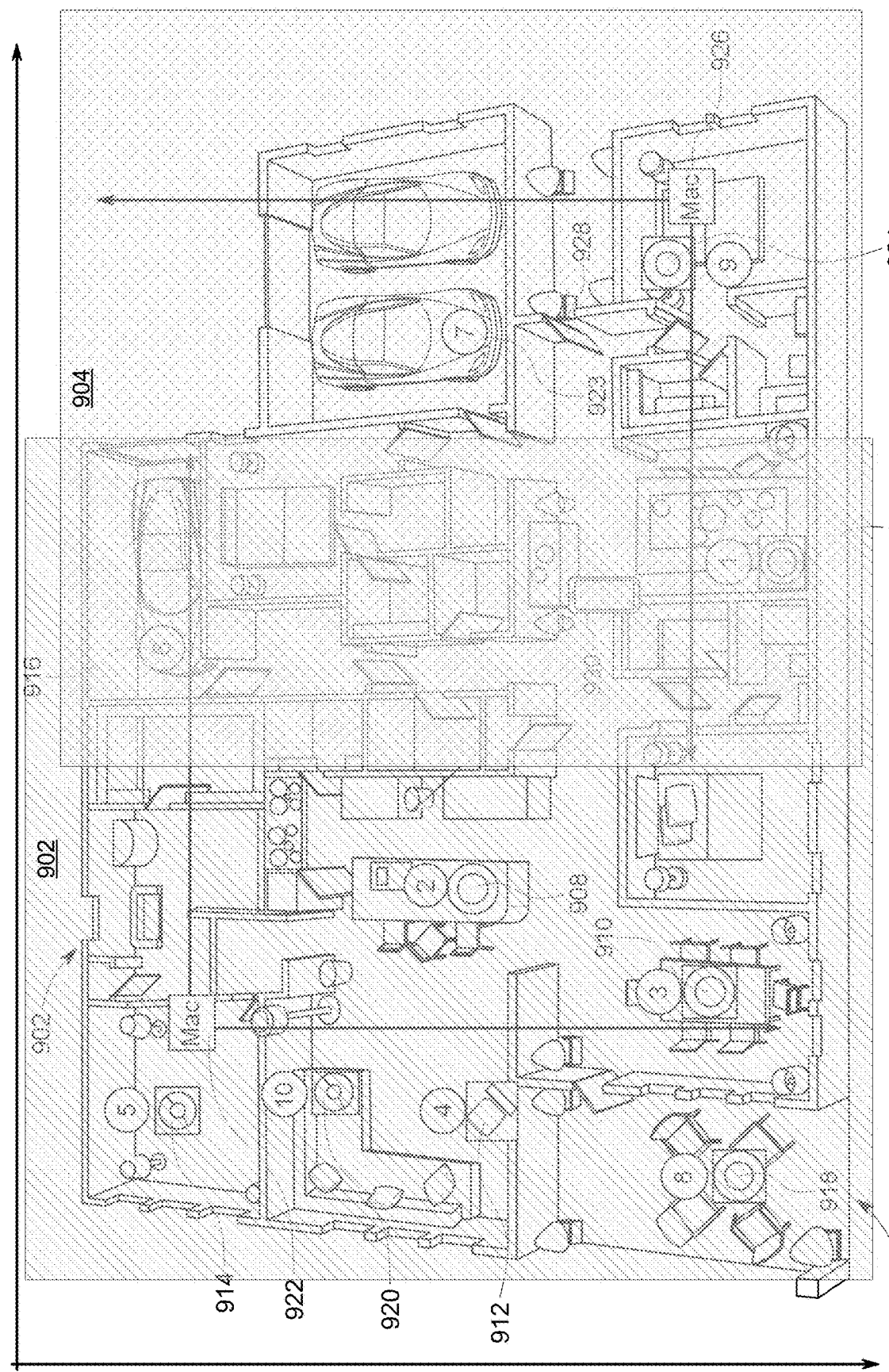
FIG. 9 illustrates a diagram for transforming two independent coordinate systems.

FIG. 9 illustrates a diagram for transforming two independent coordinate systems. FIG. 9 illustrates a first coordinate system 902 overlapping a second coordinate system 904. Device-1 906, device-2 908, device-3 910, device-4 912, device-5 914, device-6 916, device-8 918, device-10 920, and a first computing device-1 922 can be mapped into the first coordinate system 902. Device-7 923, device-9 924, and second computing device-2 926 can be mapped into the second coordinate system 904. In some cases, device-1 906 and device-6 916 can be mapped into both the first coordinate system 902 and the second coordinate system 904. The first computing system-1 923 and the second computing system-2 926 can be used to receive the signals from the rest of the connected devices in each respective coordinate system.

Each of the electronic devices can wirelessly communicate with either and/or both the respective computing device and/or the computing system of the respective coordinate system. In various embodiments, each electronic device can either determine a range between each electronic device and the other electronic devices and computing devices. In various embodiments, each electronic device can measure a time-of-flight value and/or a received signal strength value. The time-of-flight value and/or the received signal strength value can be stored in a memory of the electronic device. In various embodiments, each electronic device can calculate a range value based on the time-of-flight and/or the received signal strength value. In various embodiments, the electronic device can transmit the time-of-flight value and/or the received signal strength value to the other electronic devices/and or the computing device. In various embodiments, the electronic device can transmit the calculated range value to the other electronic devices/and or the computing device.

In various embodiments, each electronic device can transmit a time-of-flight measurement of the wireless signal or a measured signal strength of the wireless signal to the respective computing device. The computing device can receive the time-of-flight measurement or the measured signal strength. The computing device can calculate a range value using the time-of-flight measurement and/or the measured signal strength. The computing device can store the range value in a memory of the computing device. The computing device can transmit the calculated range value to the other electronic devices, the mobile device, and/or the other computing device.

In an exemplary use case, if the two independent coordinate systems are transformed into a single universal reference system, a user located within the second coordinate system 904, e.g., the front door 928 can locate keys attached to device-10 920 that is located in the first coordinate system 902 but not within the second coordinate system 904.

The electronic devices can be any suitably equipped device capable of conducting ranging via wireless RF communications (e.g., UWB ranging, Wi-Fi, Bluetooth, etc.). For example, device-1 906, device-2 908, device-3 910, device-9 924 and device-8 are exemplary smart speakers. Device-5 914 and device-10 are exemplary electronic tags. Device-6 916 and device-7 923 are exemplary connected vehicles having wireless communication capabilities. Computing device-1 and computing device-2 are marked "Mac" but can be any computer with wireless communication capabilities. The environment depicted in FIG. 9 is merely exemplary and multiple different configurations, different devices and different local coordinate systems could be utilized.

The process of transforming the two independent coordinate systems into a universal coordinate system can occur as follows. Each computing device for each of the independent coordinate system can generate a mapping of the location of each of the devices relative to each of the other electronic devices and the computing device in the local coordinate system. The mapping for each local coordinate system can be stored on the computing device for each independent coordinate system as described above.

A mobile device 930 (e.g., a smartphone, a tablet computer, or a wearable device) can conduct ranging with one or more devices associated within the first local coordinate system 902. In various embodiments, a first local coordinate system 902 and a second coordinate system 904 can include a plurality of fixed electronic devices and a mobile device that travels from one local coordinate system to another. The mobile device 930 can establish a relative position of the one or more devices of the first local coordinate system. In various embodiments, the mobile device 930 can receive the mapping file of the first local coordinate system 902 from a computing device within the first local coordinate system 902 (e.g., a first computing device-1 922). The mobile device 930 can store the mapping file into memory. In various embodiments, one of the electronic devices other than the computing device can generate a mapping of the electronic devices and share the mapping with the electronic devices in the first local coordinate system 902.

The mobile device 930 can also conduct ranging with one or more devices associated with the second coordinate system 904. The mobile device 930 can establish a relative position of the one or more devices of the second local coordinate system 904. In various embodiments, the mobile device 930 can receive a mapping file of the second peer-to-peer coordinate system from the second computing device-2 926. The mobile device 930 can store the second mapping file into memory.

In various embodiments, the mobile device 930 may have independent location information (e.g., GNSS information). If the mobile device 930 has independent geolocation information, it can share that information with the first computing device-1 922 and/or the second computing device-2 926, and/or each of the electronic devices in the first local coordinate system 902 or the second coordinate system 904. In various embodiments, with the first computing device-1 922 and/or the second computing device-2 926 can determine a relative position to the mobile device. The first computing device-1 922 and/or the second computing device-2 926 can determine a universal coordinate system location for each of the electronic devices and computing devices in the first local coordinate system 902 or the second coordinate system 904 by using the first mapping of relative positions and the second mapping of relative positions and the global position of the mobile device. Then each of the mappings for the first local coordinate system 902 and the second local coordinate system 904 can be converted to the universal coordinate system using the GNNS location information from the mobile device.

In various embodiments, mobile device 930 can include one or more motion sensors (e.g., accelerometer, gyroscope, camera) to track motion for the mobile device 930. In the absence of GNSS information, the detected motion of the mobile device 930 can detect the mobile device 930 leaving one local coordinate system and entering a second local coordinate system. One or more processors on the mobile device 930 can use the detected motion to determine a translation vector. The translation vector can be a vector between the local coordinate systems. The translation vector can be used to combine the mapping for the first coordinate system 902 and the second coordinate system 904.

Various techniques for merging the local coordinate systems can be performed without the use of a mobile device 930. These techniques can involve the use of a tie nodes. Tie nodes can be electronic devices that can be mapped into both the local coordinate systems. For example, device-1 906 and/or device-6 916 can be mapped into both the first local coordinate system 902 and the second local coordinate system 904. Device-1 906 and/or device-6 916 can be examples of tie nodes that tie the two coordinate systems together. These devices can be an anchor device to translate the coordinates of the devices of one local coordinate system into the other. For example, a mapping of one of the local coordinate systems can be selected as an initial mapping for a universal coordinate system. The tie node devices (e.g., device-1 906 and/or device-6 916) can receive and store a mapping of the second local coordinate system 904. The tie node devices can transmit the mapping of the second local coordinate system 904 to the first computing device 922.

The first computing device-1 922 can use the mapping of the relative locations of the electronic devices in the second local coordinate system 904 to map the electronic devices in the second local coordinate system 904 into the initial mapping for the universal coordinate system. In various embodiments, one or more of the tie nodes can use the mapping of the relative locations of the electronic devices in the second local coordinate system 904 to map the electronic devices in the second local coordinate system 904 into the initial mapping for the universal coordinate system. In various embodiments, the first computing device-1 922 can transfer the new universal map to one or more of the tie nodes. The tie nodes (e.g., device-1 906 and/or device-6 916) can transfer the universal coordinate map to the second computing device-2 926. The second computing device-2 926 can store the universal coordinate system mapping.

In various embodiments, the mobile device 930 may not have independent location information (e.g., GNSS information). It is possible that there are no devices from either of the local coordinate systems that overlap such that a device can be mapped into both local coordinate systems. The mobile device 930 can be used as the anchor device. The mobile device can conduct ranging sessions with one or more devices of one of the plurality of coordinate systems. As a user walks through a location (e.g., a house, an office, a venue) the mobile device can travel through different local coordinate systems. The mobile device can receive a mapping from the computing device from one or more of the local coordinate systems. The mobile device can use the range information from the ranging sessions to resolve any ambiguities between the local coordinate systems and generate a universal coordinate mapping comprising of participating devices in the different local coordinate systems.

C. Flow Diagram

Figure 10:
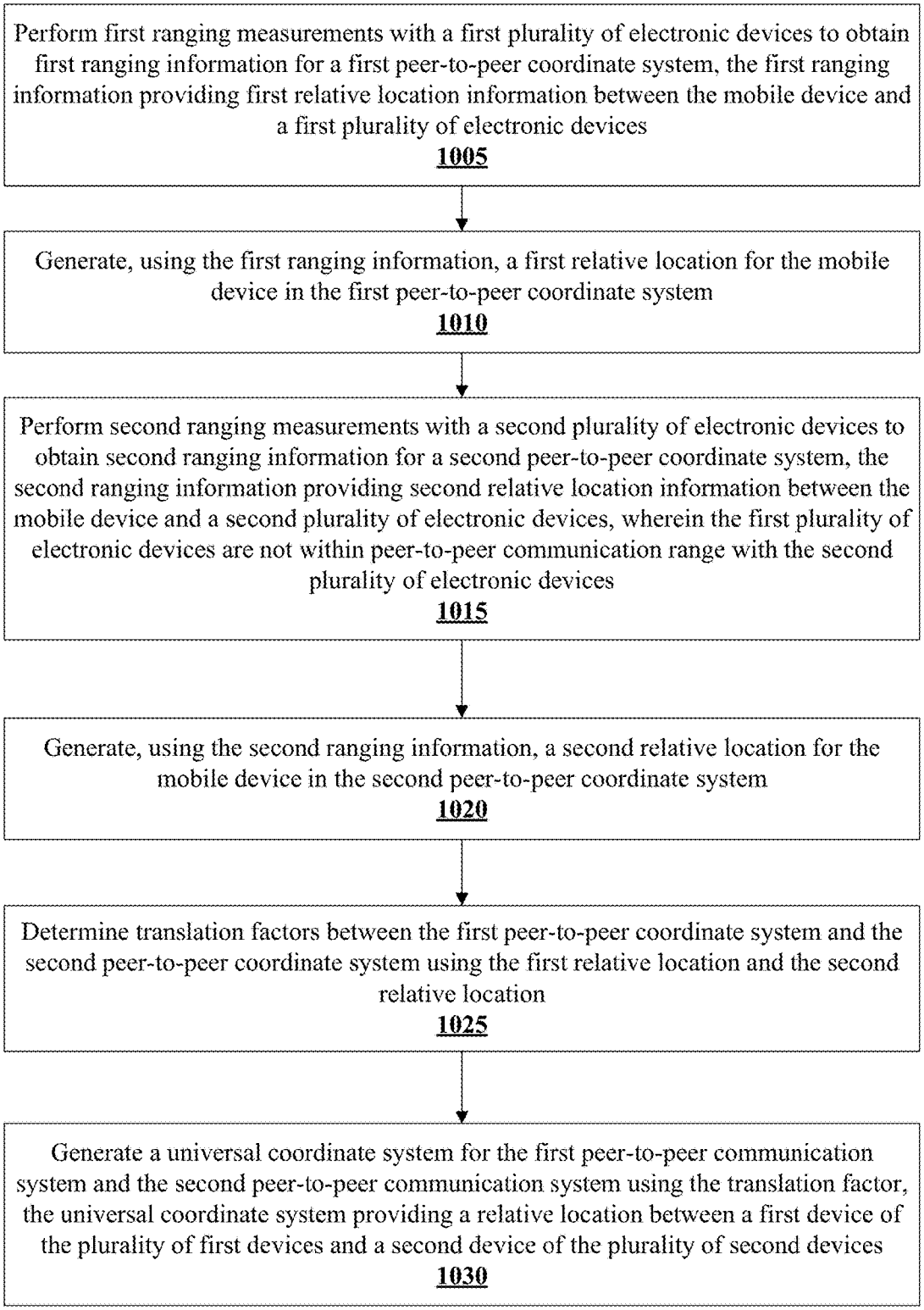
FIG. 10 illustrates a flowchart for a technique for transforming two independent coordinate systems.

FIG. 10 illustrates a flowchart for process 1000 for a technique for transforming two independent coordinate systems. According to an example, one or more process blocks of FIG. 10 may be performed by an electronic device (e.g., the mobile device 930. In various embodiments, the one or more process blocks of FIG. 10 may be performed by any one of the computing devices and or electronic devices in a local coordinate system.

At block 1005, process 1000 may include performing first ranging measurements with a first plurality of electronic devices to obtain first ranging information for a first peer-to-peer coordinate system. The first ranging information can allow for a determination of a first relative location information between the mobile device and a first plurality of electronic devices. For example, electronic device may perform first ranging measurements with a first plurality of electronic devices to obtain first ranging information for a first peer-to-peer coordinate system, the first ranging information providing first relative location information between the mobile device and a first plurality of electronic devices, in sections IIA and IIB above.

In various embodiments, the first ranging information for a first peer-to-peer coordinate system can be a measured time-of-flight of a wireless signal as discussed in sections IIA and IIB above. In various embodiments, the first ranging information for a first peer-to-peer coordinate system can be a measured received signal strength of a wireless signal as discussed in sections IIA and IIB above.

The wireless signals can include identifying information for the second electronic device and or the first electronic device. In this way, the electronic device can identify a source of the wireless transmissions. The wireless signals can also include other information packets that can be used for determining a range between the electronic device and the second electronic device. The other information packets can include processing/turnaround times, calculated range, or round-trip time information, etc. In various embodiments, the first ranging information can be determined using ultra-wideband ranging.

At block 1010, process 1000 may include generating, using the first ranging information, a first relative location for the mobile device in the first peer-to-peer coordinate system. For example, electronic device may generate, using the first ranging information, a first relative location for the mobile device in the first peer-to-peer coordinate system, as described in description for FIG. 9.

Two or more of the electronic devices in a first peer-to-peer communication system can wirelessly communicate with either and/or both the respective computing device and/or the computing system of the respective coordinate system. In various embodiments, each electronic device can either determine a range between each electronic device and the other electronic devices and computing devices. In various embodiments, each electronic device can measure a time-of-flight value and/or a received signal strength value. The time-of-flight value and/or the received signal strength value can be stored in a memory of the electronic device. In various embodiments, each electronic device can calculate a range value based on the time-of-flight and/or the received signal strength value. In various embodiments, the electronic device can transmit the time-of-flight value and/or the received signal strength value to the other electronic devices/and or the computing device. The computing device can transmit the calculated range value to the other electronic devices, the mobile device, and/or the other computing device.

In various embodiments, one or more processors on the mobile device can calculate range values using the first ranging information. The mobile device can store the range value in a memory of the mobile device. The mobile device can transmit the calculated range value to the other electronic devices and/or other computing devices.

In various embodiments, the mobile device can calculate a first relative location for the mobile device in the first peer-to-peer coordinate system using the range information. For example, a ranging session between the mobile device 930, as shown in FIG. 9, and a first electronic device (e.g., electronic device-2 908) can provide ranging information that can be used to determine a first distance between the mobile device and the first electronic device (e.g., electronic device-2 908). A ranging session between the mobile device 930 and a second electronic device (e.g., electronic device-3 910) can provide ranging information that can be used to determine a second distance between the mobile device and the second electronic device (e.g., electronic device-3 910). A ranging session between the first electronic device (e.g., electronic device-2 908) and the second electronic device (e.g., electronic device-3 910) can provide ranging information that can be used to determine a third distance between the first electronic device and the second electronic device. The first distance, the second distance, and the third distance can be used to establish a spatial relationship between the electronic devices that can be used to generate a first mapping of relative positions for a first peer-to-peer coordinate system. Additional ranging can be conducted between the devices in the first coordinate system 902. A location of the mobile device can be included within the first mapping. The first mapping can be stored in a memory of the mobile device.

At block 1015, process 1000 may include performing second ranging measurements with a second plurality of electronic devices to obtain second ranging information for a second peer-to-peer coordinate system.

In various embodiments, the second ranging information for a second peer-to-peer coordinate system can be a measured time-of-flight of a wireless signal as discussed in sections IIA and IIB above. In various embodiments, the second ranging information for the second peer-to-peer coordinate system can be a measured received signal strength of a wireless signal as discussed in sections IIA and IIB above.

At block 1020, process 1000 may include generating, using the second ranging information, a second relative location for the mobile device in the second peer-to-peer coordinate system. For example, electronic device may generate, using the second ranging information, a second relative location for the mobile device in the second peer-to-peer coordinate system.

The second ranging information can be used to calculate second relative location information between the mobile device and a second plurality of electronic devices. In this case, the first plurality of electronic devices is outside peer-to-peer communication range with the second plurality of electronic devices. For example, electronic device may perform second ranging measurements with a second plurality of electronic devices to obtain second ranging information for a second peer-to-peer coordinate system. The second ranging information can provide second relative location information between the mobile device and a second plurality of electronic devices.

Two or more of the electronic devices in a second peer-to-peer communication system can wirelessly communicate with either and/or both the respective computing device and/or the computing system of the respective coordinate system. In various embodiments, each electronic device can either determine a range between each electronic device and the other electronic devices and computing devices. In various embodiments, each electronic device can measure a time-of-flight value and/or a received signal strength value. The time-of-flight value and/or the received signal strength value can be stored in a memory of the electronic device. In various embodiments, each electronic device can calculate a range value based on the time-of-flight and/or the received signal strength value. In various embodiments, the electronic device can transmit the time-of-flight value and/or the received signal strength value to the other electronic devices/and or the computing device.

The computing device can transmit the calculated range value to the other electronic devices, the mobile device, and/or the other computing device.

In various embodiments, one or more processors on the mobile device can calculate range values using the second ranging information. The mobile device can store the range value in a memory of the mobile device. The mobile device can transmit the calculated range value to the other electronic devices and/or other computing devices.

In various embodiments, the mobile device can calculate a second relative location for the mobile device in the second peer-to-peer coordinate system using the range information. For example, a ranging session between the mobile device 930, as shown in FIG. 9, and a second computing device (e.g., computing device-2 926) can provide ranging information that can be used to determine a fourth distance between the mobile device and the second computing device (e.g., computing device-2 926). A ranging session between the mobile device 930 and a third electronic device (e.g., electronic device-9 924) can provide ranging information that can be used to determine a fifth distance between the mobile device and the third electronic device (e.g., electronic device-9 924). A ranging session between the second computing device (e.g., computing device-2 926) and the third electronic device (e.g., electronic device-9 924) can provide ranging information that can be used to determine a sixth distance between the second computing device and the third electronic device. The fourth distance, the fifth distance, and the sixth distance can be used to establish a spatial relationship between the electronic devices that can be used to generate a second mapping of relative positions for the second peer-to-peer coordinate system. Additional ranging can be conducted between the devices in the second coordinate system 904. A location of the mobile device can be included within the second mapping. The second mapping can be stored in a memory of the mobile device.

The second ranging information can be used to generate a mapping of the relationship between the devices in the second peer-to-peer coordinate system including a location of the mobile device within that mapping. The mapping can be stored in a memory of the mobile device.

In various embodiments, the two or more independent coordinate systems of peer-to-peer communication networks of process 1000 can include multiple levels of an underground parking garage.

At block 1025, process 1000 may include determining translation factors between the first peer-to-peer coordinate system and the second peer-to-peer coordinate system using the first relative location and the second relative location. For example, electronic device may determine translation factors between the first peer-to-peer coordinate system and the second peer-to-peer coordinate system using the first relative location and the second relative location, as described above.

In various embodiments, process 1000 can include determining one or more translation factors by determining a lateral distance and a longitudinal distance between the first relative location and the second relative location.

In various embodiments, process 1000 can include determining the one or more translation factors by determining a movement vector of the mobile device using sensors on the mobile device.

The translation factors can include one or more shifts to in a vertical (y-axis), a horizontal (x-axis), and a depth (z-axis) position in a map for an electronic device. For example, the mobile device can determine that the device mapping for the plurality of devices is off by +0.2 meters horizontally in the second peer-to-peer network. Therefore, the mobile device can shift the positions of the devices −0.2 meters horizontally to adjust. The shift of −0.2 meters can be considered a translation factor. The translation factors can be in one or more adjustments in one or more directions and in all three directions of a vertical (y-axis), a horizontal (x-axis), and a depth (z-axis) position. While these translation factors are described using a Cartesian coordinate reference system, other references systems can be used include polar coordinates.

At block 1030, process 1000 may include generating a universal coordinate system for the first peer-to-peer communication system and the second peer-to-peer communication system using the translation factor, the universal coordinate system providing a relative location between a first device of the plurality of first devices and a second device of the plurality of second devices. For example, electronic device may generate a universal coordinate system for the first peer-to-peer communication system and the second peer-to-peer communication system using the translation factor, the universal coordinate system providing a relative location between a first device of the plurality of first devices and a second device of the plurality of second devices, as described above.

In various embodiments, process 1000 can include generating the universal coordinate system by accessing a first mapping of electronic devices of the first peer-to-peer coordinate system; accessing a second mapping of electronic devices the second peer-to-peer coordinate system; designated either the first mapping of electronic devices or the second mapping of electronic devices as an initial universal mapping of electronic devices; and shifting locations of the electronic devices in a non-designed first mapping of electronic devices or the second mapping of the electronic devices.

In various embodiments, the mobile device 930 as shown in FIG. 9 can be the origin in a universal coordinate system and each of the positions of the electronic devices in the first peer-to-peer coordinate system and the second peer-to-peer coordinate system can be translated into the coordinates of the mobile device 930.

In various embodiments, process 1000 can further include determining a location of the mobile device within a structure based on the universal coordinate system. Responsive to the location of the mobile device within the structure being within predetermined limits, process 1000 can further include receiving an input for a virtual note. A virtual note can be a message that is generated by one user for consumption by a second user. The virtual note can be stored on a network or in a memory of an electronic device. The virtual note can be displayed when the mobile device for the second user is within a predetermined range of a position in the universal coordinate system. Process 1000 can further include sending the location of the mobile device and the input for the virtual note to a second electronic device.

In various embodiments, process 1000 can include determining a location of the mobile device within a structure based on the universal coordinate system. Responsive to the location of the mobile device within the structure being within predetermined limits, process 1000 can include retrieving a virtual note from a memory of the mobile device. Process can include presenting the virtual note on a display of the mobile device.

In various embodiments, process 1000 can include determining a location of the mobile device based on the universal coordinate system. Responsive to the location of the mobile device being within predetermined location, process 1000 can include transmitting a wireless signal to a vehicle to perform an operation on the vehicle. For example, at a first predetermined location (e.g., near any of the vehicle doors), the vehicle doors can unlock. At a second predetermined location (e.g., in vicinity of the vehicle trunk), the trunk door can open. At a third, predetermined location, a fuel access panel door can unlock.

In various embodiments, process 1000 can include determining a location of an electronic tag within a structure based on the universal coordinate system. Process 1000 can include accessing a virtual map of the structure. Process 1000 can include displaying the location of the electronic tag in the virtual map of the structure.

It should be noted that while FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

D. Use Cases

The location techniques can be used to provide location information for devices. For example, some electronic trackers transmit a wireless signal. A mobile device can receive the wireless signal from an electronic tracker. Currently, the mobile device can provide directional information (e.g., straight ahead for 10 feet) that a user can use to locate the device. Using the improved location techniques, the mobile device can receive location of the electronic tracker mapped into a local coordinate system. The mapping of the devices in the local coordinate system can be stored in a memory of the mobile device.

Figure 11:
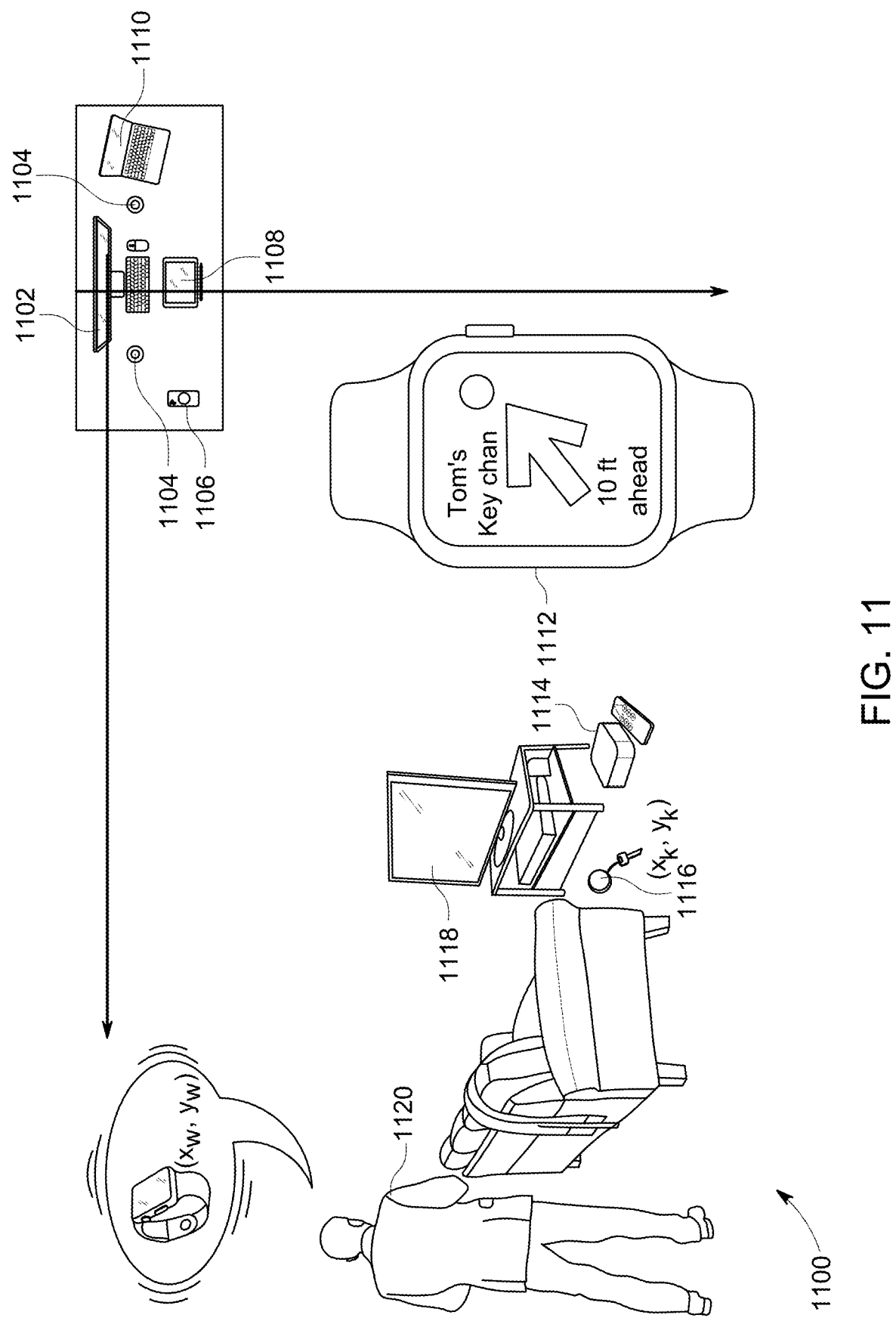
FIG. 11 illustrates a diagram for a use case for locating an electronic device.

FIG. 11 illustrates an exemplary environment 1100 for implementation of the techniques for location determination. FIG. 11 illustrates a computing device 1102 that communications with a plurality of electronic devices having a wireless communication capability. The plurality of electronic devices can include one or more smart speakers 1104, one or more mobile device 1106, one or more tablet computers 1108, one or more laptop computers 1110, one or more wearable devices 1112, one or more media devices 1114, one or more electronic trackers 1116; and one or more display devices 1118. Each of the electronic devices can conduct ranging with the computing device 1102. The computing device 1102 can generate a map of the electronic devices and relative positions of the electronic devices in the map. In various embodiments, the electronic devices can conduct ranging with each other to increase the precision of the location.

In an exemplary use case, if the two independent coordinate systems are transformed into a single universal reference system, a user located in the area within the second coordinate system 904, e.g., the front door 928 can locate keys attached to device-10 920 that is located in the first coordinate system 902 but not within the second coordinate system 904.

Further, the techniques can improve current localization techniques. For example, in one scenario, a user 1120 would like to find keys. An electronic tracker 1116 can be attached to the keys. In various embodiments, the techniques can use the local information to determine a location of the electronic tracker 1116 holding the keys in a map of the peer-to-peer network. In various embodiments, the computing device 1102 can send the location information to the wearable device. In various embodiments, the computing device 1102 can send the location information to a mobile device paired with the wearable device. In various embodiments, the wearable device can receive the location information from the electronic tracker 1116 to the wearable device 1112. These techniques can improve the ease of locating the keys as the location can be displayed in a virtual map of the location.

Other potential use cases may include virtual notes. A user may be able to establish a location to leave another user a virtual note. For example, a first user can program a virtual note for a position in front of a bathroom sink. When a second user is within a threshold position from the predetermined position, an alert can appear on a display of the second user to display a message from the first user (e.g., a reminder to brush her teeth). Similar virtual notes can be used at different locations.

IV. Mobile Device for Enhanced Ranging Techniques

Figure 12:
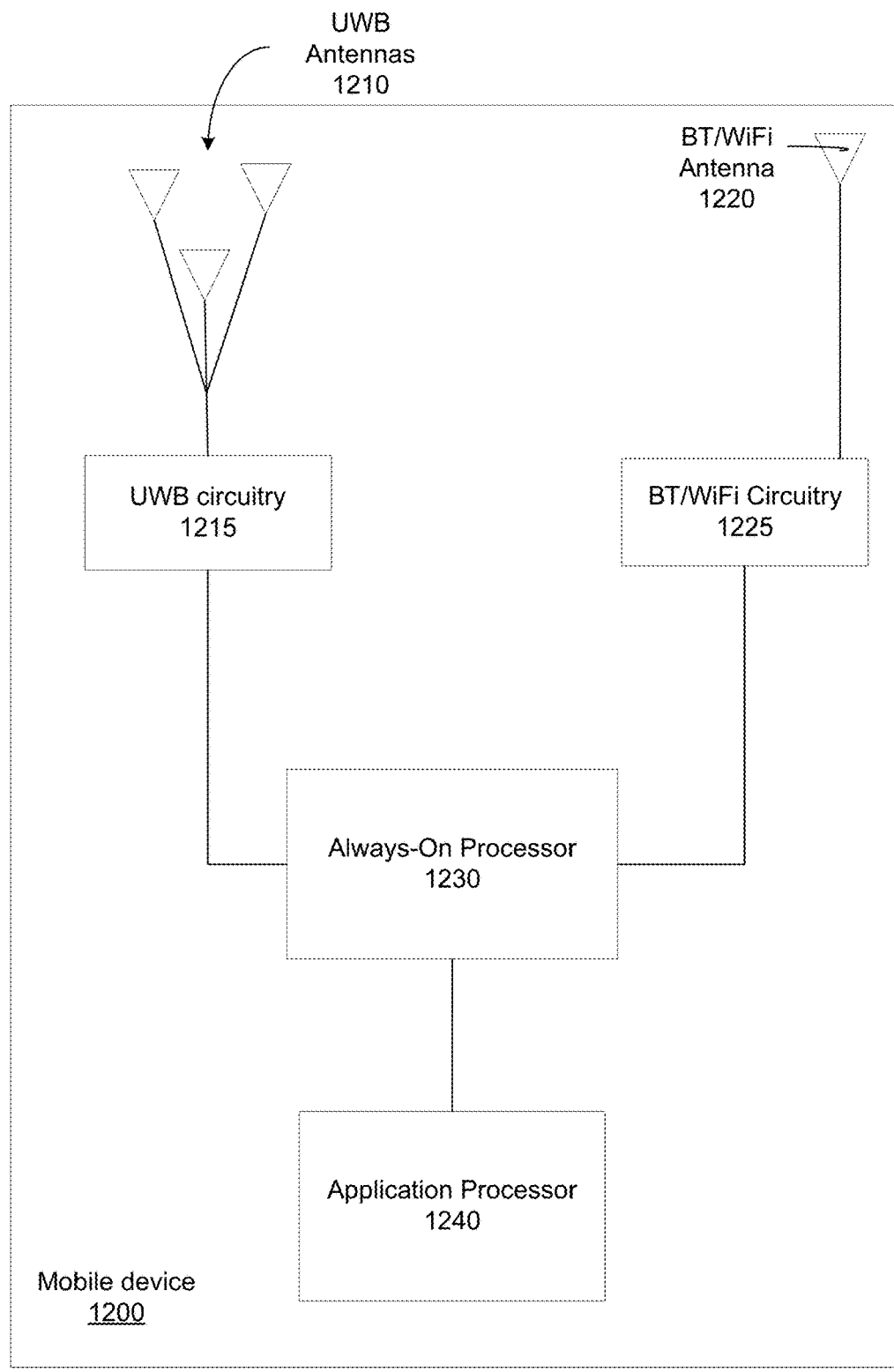
FIG. 12 is a block diagram of components of an electronic device operable to perform ranging according to embodiments of the present disclosure.

FIG. 12 is a block diagram of components of a mobile device 1200 operable to perform passive beacon communication techniques according to embodiments of the present disclosure. Mobile device 1200 includes antennas for at least two different wireless protocols, as described above. The first wireless protocol (e.g., Bluetooth) may be used for authentication and exchanging ranging settings. The second RF wireless protocol (e.g., UWB) may be used for performing ranging with another mobile device.

As shown, mobile device 1200 includes RF (e.g., UWB) antennas 1210 for performing ranging. The RF (e.g., UWB) antennas 1210 are connected to RF (e.g., UWB) circuitry 1215 for analyzing detected signals from the RF (e.g., UWB) antennas 1210. In some embodiments, mobile device 1200 includes three or more RF (e.g., UWB) antennas, e.g., for performing triangulation. The different RF (e.g., UWB) antennas can have different orientations, e.g., two in one direction and a third in another direction. The orientations of the RF (e.g., UWB) antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

RF (e.g., UWB) circuitry 1215 can communicate with an always-on processor (AOP) 1230, which can perform further processing using information from the RF (e.g., UWB) messages. For example, AOP 1230 can perform the ranging calculations using timing data provided by the RF (e.g., UWB) circuitry 1215. AOP 1230 and other circuits of the device can include dedicated circuitry and/or configurable circuitry, e.g., via firmware or other software.

As shown, mobile device 1200 also includes Bluetooth (BT)/Wi-Fi antenna 1220 for communicating data with other devices. Bluetooth (BT)/Wi-Fi antenna 1220 is connected to BT/Wi-Fi circuitry 1225 for analyzing detected signals from BT/Wi-Fi antenna 1220. For example, BT/Wi-Fi circuitry 1225 can parse messages to obtain data (e.g., an authentication tag), which can be sent on to AOP 1230. In some embodiments, AOP 1230 can perform authentication using an authentication tag. Thus, AOP 1230 can store or retrieve a list of authentication tags for which to compare a received tag against, as part of an authentication process. In some implementations, such functionality could be achieved by BT/Wi-Fi circuitry 1225.

In other embodiments, UWB circuitry 1215 and BT/Wi-Fi circuitry 1225 can alternatively or in addition be connected to application processor 1240, which can perform similar functionality as AOP 1230. Application processor 1240 typically requires more power than AOP 1230, and thus power can be saved by AOP 1230 handling certain functionality, so that application processor 1240 can remain in a sleep state, e.g., an off state. As an example, application processor 1240 can be used for communicating audio or video using BT/Wi-Fi, while AOP 1230 can coordinate transmission of such content and communication between UWB circuitry 1215 and BT/Wi-Fi circuitry 1225. For instance, AOP 1230 can coordinate timing of UWB messages relative to BT advertisements.

Coordination by AOP 1230 can have various benefits. For example, a first user of a sending device may want to share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1230. In addition, it is not desirable to wake up the application processor of every other device in the room, and thus the AOPs of the other devices can perform some processing of the messages and determine that the destination address is for a different device.

To perform ranging, BT/Wi-Fi circuitry 1225 can analyze an advertisement signal from another device to determine that the other device wants to perform ranging, e.g., as part of a process for sharing content. BT/Wi-Fi circuitry 1225 can communicate this notification to AOP 1230, which can schedule UWB circuitry 1215 to be ready to detect UWB messages from the other device.

For the device initiating ranging, its AOP can perform the ranging calculations. Further, the AOP can monitor changes in distance between the other devices. For example, AOP 1230 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

V. Example Mobile Device

Figure 13:
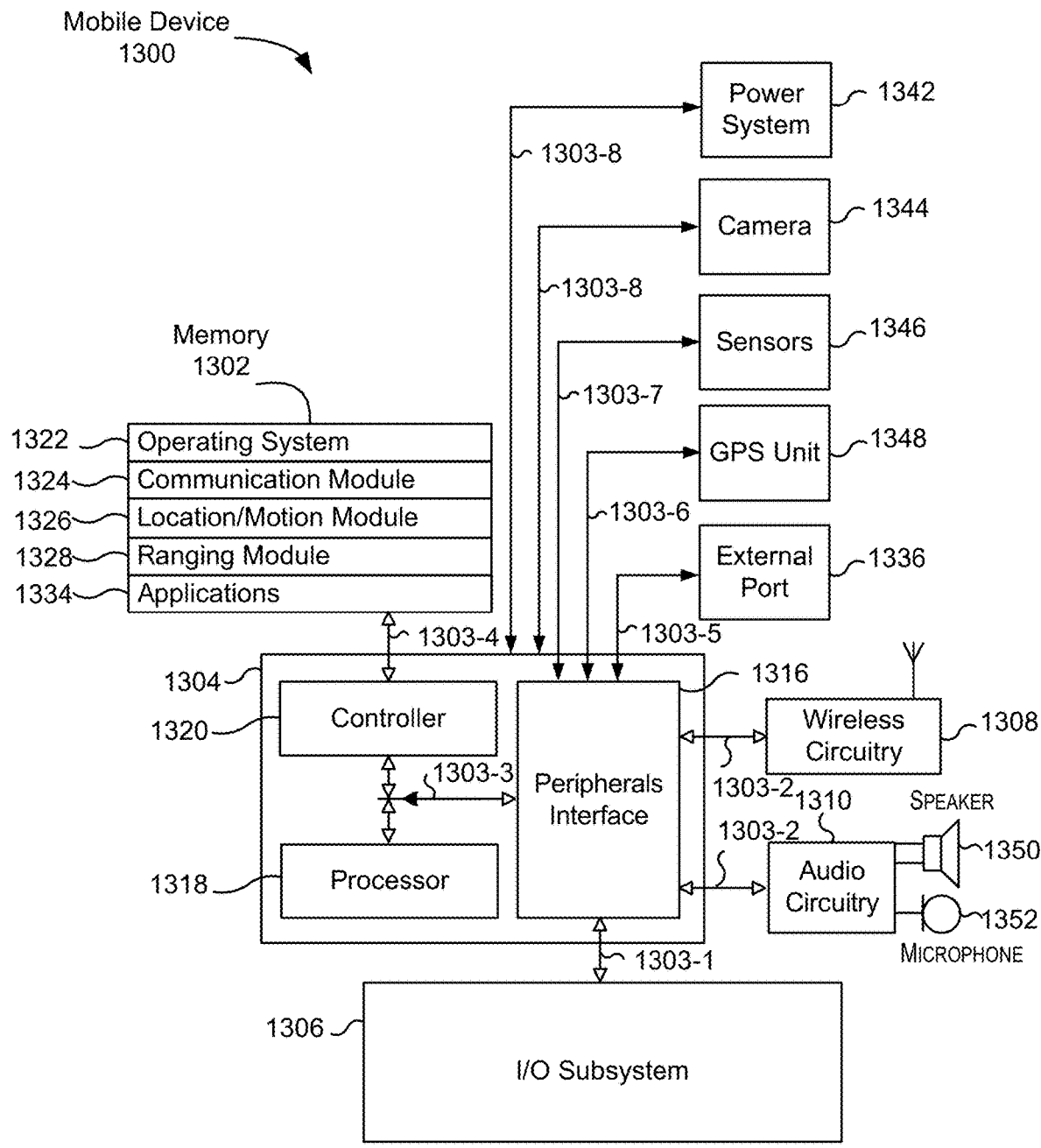
FIG. 13 is a block diagram of an example mobile device.

FIG. 13 is a block diagram of an example mobile device 1300. The mobile device 1300 can include a smartphone, a wearable device (e.g., a smartwatch, smart glasses), a tablet computer, a laptop computer, or a desktop computer. The mobile device 1300 generally includes computer-readable medium 1302, control circuitry 1304, an Input/Output (I/O) subsystem 1306, wireless circuitry 1308, and audio circuitry 1310 including speaker 1350 and microphone 1352. These components may be coupled by one or more communication buses or signal lines 1303. Mobile device 1300 can be any portable electronic device, including a handheld computer, a tablet computer, a mobile phone, a laptop computer, a tablet device, a media player, a personal digital assistant (PDA), a key fob, a car key, an access card, a multifunction device, a mobile phone, a portable gaming device, a headset, or the like, including a combination of two or more of these items.

It should be apparent that the architecture shown in FIG. 13 is only one example of an architecture for mobile device 1300, and that mobile device 1300 can have more or fewer components than shown, or a different configuration of components. The various components shown in FIG. 13 can be implemented in hardware, software, or a combination of both hardware and software, including one or more signal processing and/or application-specific integrated circuits.

Wireless circuitry 1308 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1308 can use various protocols, e.g., as described herein. In various embodiments, wireless circuitry 1308 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1308 is coupled to control circuitry 1304 via peripherals interface 1316. Peripherals interface 1316 can include conventional components for establishing and maintaining communication between peripherals. Voice and data information received by wireless circuitry 1308 (e.g., in speech recognition or voice command applications) is sent to one or more processors 1318 via peripherals interface 1316. One or more processors 1318 are configurable to process various data formats for one or more application programs 1334 stored on computer-readable medium 1302.

Peripherals interface 1316 couple the input and output peripherals of mobile device 1300 to the one or more processors 1318 and computer-readable medium 1302. One or more processors 1318 communicate with computer-readable medium 1302 via a controller 1320. Computer-readable medium 1302 can be any device or medium that can store code and/or data for use by one or more processors 1318. Computer-readable medium 1302 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read Only Memory (ROM), FLASH, magnetic and/or optical storage devices, such as disk drives, magnetic tape, CDs (compact disks) and DVDs (digital video discs). In some embodiments, peripherals interface 1316, one or more processors 1318, and controller 1320 can be implemented on a single chip, such as control circuitry 1304. In some other embodiments, they can be implemented on separate chips.

Processors 1318 can include hardware and/or software elements that perform one or more processing functions, such as mathematical operations, logical operations, data manipulation operations, data transfer operations, controlling the reception of user input, controlling output of information to users, or the like. Processors 1318 can be embodied as one or more hardware processors, microprocessors, microcontrollers; field programmable gate arrays (FPGAs), application-specified integrated circuits (ASICs), or the like.

Mobile device 1300 may include storage and processing circuitry such as control circuitry 1304. Control circuitry 1304 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1304 may be used to control the operation of mobile device 1300. This processing circuitry may be based on one or more microprocessors, microcontrollers, digital signal processors, baseband processor integrated circuits, application specific integrated circuits, etc.

Control circuitry 1304 may be used to run software on mobile device 1300, such as internet browsing applications, voice-over-internet-protocol (VOIP) telephone call applications, email applications, media playback applications, operating system functions, etc. To support interactions with external equipment, control circuitry 1304 may be used in implementing communications protocols. Communications protocols that may be implemented using control circuitry 1304 include internet protocols, wireless local area network protocols (e.g., IEEE 802.11 protocols-sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Mobile device 1300 may include I/O subsystems 1306. I/O subsystems 1306 may include input-output devices. Input-output devices may be used to allow data to be supplied to mobile device 1300 and to allow data to be provided from mobile device 1300 to external devices. Input-output devices may include user interface devices, data port devices, and other input-output components. For example, input-output devices may include one or more displays (e.g., touch screens or displays without touch sensor capabilities), one or more image sensors 1344 (e.g., digital image sensors), motion sensors, and speakers 1350. Input-output devices may also include buttons, joysticks, scrolling wheels, touch pads, key pads, keyboards, microphones 1352, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Mobile device 1300 also includes a power system 1342 for powering the various hardware components. Power system 1342 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1300 includes an image sensor 1344 (e.g., a camera). In some embodiments, mobile device 1300 includes sensors 1346. Sensors can include accelerometers, compass, gyrometer, pressure sensors, audio sensors, light sensors, barometers, and the like. Sensors 1346 can be used to sense location aspects, such as auditory or light signatures of a location.

In some embodiments, mobile device 1300 can include a Global Positioning System (GPS) receiver, sometimes referred to as a GPS unit 1348. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1318 run various software components stored in computer-readable medium 1302 to perform various functions for mobile device 1300. In some embodiments, the software components include an operating system 1322, a communication module 1324 (or set of instructions), a location/motion module 1326 (or set of instructions), a ranging module 1328 that is used as part of ranging operation described herein, and other application programs 1334 (or set of instructions).

Operating system 1322 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1324 facilitates communication with other devices over one or more external ports 1336 or via wireless circuitry 1308 and includes various software components for handling data received from wireless circuitry 1308 and/or external port 1336. External port 1336 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1326 can assist in determining the current position (e.g., coordinates or other geographic location identifiers) and motion of mobile device 1300. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1326 receives data from GPS unit 1348 and analyzes the signals to determine the current position of the mobile device. In some embodiments, location/motion module 1326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1308 and is passed to location/motion module 1326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 1300 based on the position coordinates of the corresponding transmitters. Regardless of the specific location technology used, location/motion module 1326 receives information from which a location fix can be derived, interprets that information, and returns location information, such as geographic coordinates, latitude/longitude, or other location fix data, Ranging module 1328 can send/receive ranging messages to/from an antenna, e.g., connected to wireless circuitry 1308. The messages can be used for various purposes, e.g., to identify a sending antenna of a device, determine timestamps of messages to determine a distance of mobile device 1300 from another device. Ranging module 1328 can exist on various processors of the device, e.g., an always-on processor (AOP), a UWB chip, and/or an application processor. For example, parts of ranging module 1328 can determine a distance on an AOP, and another part of the ranging module can interact with a sharing module, e.g., to display a position of the other device on a screen in order for a user to select the other device to share a data item. Ranging module 1328 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of mobile device 1300 (e.g., portions of the display cover layer, portions of a plastic antenna window in a metal housing sidewall portion of housing, etc.). With one illustrative configuration, some or all of the rear face of mobile device 1300 may be formed from a dielectric. For example, the rear wall of housing may be formed from glass plastic, ceramic, other dielectric. In this type of arrangement, antennas may be mounted within the interior of mobile device 1300 in a location that allows the antennas to transmit and receive antenna signals through the rear wall of mobile device 1300 (and, if desired, through optional dielectric sidewall portions in housing). Antennas may also be formed from metal sidewall structures in housing and may be located in peripheral portions of mobile device 1300.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas are being adversely affected due to the orientation of housing, blockage by a user's hand or other external object, or other environmental factors. Mobile device 1300 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of mobile device 1300 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in mobile device 1300. As an example, antennas may be mounted at one or both ends of mobile device 1300 (e.g., along the upper and lower edges of housing, at the corners of housing, etc.).

Antennas in mobile device 1300 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in mobile device 1300 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1344 may include one or more visible digital image sensors (visible-light cameras) and/or one or more infrared digital image sensors (infrared-light cameras). Image sensors 1344 may, if desired, be used to measure distances. For example, an infrared time-of-flight image sensor may be used to measure the time that it takes for an infrared light pulse to reflect back from objects in the vicinity of mobile device 1300, which may in turn be used to determine the distance to those objects. Visible imaging systems such as a front and/or rear-facing camera in mobile device 1300 may also be used to determine the position of objects in the environment. For example, control circuitry 1304 may use image sensors 1344 to perform simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1304 may rely entirely upon image sensors 1344 to perform simultaneous localization and mapping, or control circuitry 1304 may synthesize image data with range data from one or more distance sensors (e.g., light-based proximity sensors). If desired, control circuitry 1304 may use a display to display a visual representation of the mapped environment.

Input-output devices may include motion sensor circuitry 1346. Motion sensor circuitry 1346 may include one or more accelerometers (e.g., accelerometers that measure acceleration along one, two, or three axes), gyroscopes, barometers, magnetic sensors (e.g., compasses), image sensors (e.g., image sensor 1344) and other sensor structures. Sensors 1346 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1304 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1304. Movement generation circuitry may include electromechanical actuator circuitry that, when driven, moves mobile device 1300 in one or more directions. For example, movement generation circuitry may laterally move mobile device 1300 and/or may rotate mobile device 1300 around one or more axes of rotation. Movement generation circuitry may, for example, include one or more actuators formed at one or more locations of mobile device 1300. When driven by a motion control signal, actuators may move (e.g., vibrate, pulse, tilt, push, pull, rotate, etc.) to cause mobile device 1300 to move or rotate in one or more directions. The movement may be slight (e.g., not noticeable or barely noticeable to a user of mobile device 1300), or the movement may be substantial. Actuators may be based on one or more vibrators, motors, solenoids, piezoelectric actuators, speaker coils, or any other desired device capable of mechanically (physically) moving mobile device 1300.

Some or all of movement generation circuitry such as actuators may be used to perform operations that are unrelated to rotation of mobile device 1300. For example, actuators may include vibrators that are actuated to issue a haptic alert or notification to a user of mobile device 1300. Such alerts may include, for example, a received text message alert identifying that mobile device 1300 has received a text message, a received telephone call alert, a received email alert, an alarm notification alert, a calendar notification alert, or any other desired notification. By actuating actuator, mobile device 1300 may inform the user of any desired device condition.

Motion sensor circuitry may sense motion of mobile device 1300 that is generated by movement generation circuitry. If desired, motion sensor circuitry may provide feedback signals associated with the sensed motion of mobile device 1300 to movement generation circuitry. Movement generation circuitry may use the feedback signals to control actuation of the movement generation circuitry.

Control circuitry 1304 may use motion sensor circuitry and/or movement generation circuitry to determine the angle of arrival of wireless signals received by mobile device 1300 from another electronic device. For example, control circuitry 1304 may use movement generation circuitry to move mobile device 1300 from one position to another. Motion sensor circuitry may be used to track the movement of mobile device 1300 as it is moved between the different positions. At each position, control circuitry 1304 may receive wireless signals from another electronic device. Control circuitry 1304 may process the received wireless signals together with the motion data from motion sensor circuitry to more accurately determine the position of the other electronic device. The use of motion generation circuitry is merely illustrative, however. If desired, motion sensor circuitry may track movement of mobile device 1300 that is not caused by motion generation circuitry. This may include a user's natural, unprompted movement of mobile device 1300 and/or the user's movement of mobile device 1300 after the user is prompted (by display, audio circuitry 1310, a haptic output device in mobile device 1300, or any other suitable output device) to move mobile device 1300 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 1308 may include radio-frequency transceiver circuitry for handling various radio-frequency communications bands. For example, wireless circuitry 1308 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.1 lad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for a receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of mobile device 1300 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1334 on mobile device 1300 can include any applications installed on the mobile device 1300, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1306 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode) technology, LCD (liquid crystal display) technology, or LPD (light emitting polymer display) technology, although other display technologies can be used in other embodiments.

In some embodiments, I/O subsystem 1306 can include a display and user input devices such as a keyboard, mouse, and/or trackpad. In some embodiments, I/O subsystem 1306 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1306 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, mobile device 1300 can include a touchpad (not shown) for activating or deactivating particular functions. In some embodiments, the touchpad is a touch-sensitive area of the mobile device 1300 that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

As described above, one aspect of the present technology is the gathering, sharing, and use of data, including an authentication tag and data from which the tag is derived. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which device ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, users may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for transforming two or more independent coordinate systems of peer-to-peer communication networks, the method comprising performing, by a mobile device:
performing first ranging measurements with a first plurality of electronic devices to obtain first ranging information for a first peer-to-peer communication system, the first ranging information providing first relative location information between the mobile device and the first plurality of electronic devices; generating, using the first ranging information, a first relative location for the mobile device in the first peer-to-peer communication system; performing second ranging measurements with a second plurality of electronic devices to obtain second ranging information for a second peer-to-peer communication system, the second ranging information providing second relative location information between the mobile device and the second plurality of electronic devices, wherein the first plurality of electronic devices are not within peer-to-peer communication range with the second plurality of electronic devices; generating, using the second ranging information, a second relative location for the mobile device in a second peer-to-peer coordinate system; determining translation factors between the first peer-to-peer communication system and the second peer-to-peer communication system using the first relative location and the second relative location; and generating a universal coordinate system for the first peer-to-peer communication system and the second peer-to-peer communication system using the translation factor, the universal coordinate system providing a relative location between a first device of the first plurality of electronic devices and a second device of the second plurality of electronic devices.

2. The method of claim 1, wherein at least one of the first ranging measurements and the second ranging measurements are calculated by measuring a round trip time of a wireless signal.

3. The method of claim 1, wherein at least one of the first ranging measurements or the second ranging measurements is determined using ultrawideband ranging.

4. The method of claim 1, further comprising determining one or more translation factors by determining a lateral distance and a longitudinal distance between the first relative location and the second relative location.

5. The method of claim 1, further comprising determining one or more translation factors by determining a movement vector of the mobile device using sensors on the mobile device.

6. The method of claim 1, wherein the generating the universal coordinate system comprises: accessing a first mapping of electronic devices of the first peer-to-peer communication system; accessing a second mapping of electronic devices of the second peer-to-peer communication system; designated either the first mapping of electronic devices or the second mapping of electronic devices as an initial universal mapping of electronic devices; and shifting locations of the electronic devices in the first mapping of electronic devices or the second mapping of electronic devices.

7. The method of claim 6, wherein the shifting is a lateral and a longitudinal shift of the locations of the electronic devices.

8. The method of claim 1, wherein the two or more independent coordinate systems of peer-to-peer communication networks comprise multiple levels of an underground parking garage.

9. The method of claim 8, further comprising: determining a location of an electronic tag within a structure based on the universal coordinate system; accessing a virtual map of the structure; and displaying the location of the electronic tag in the virtual map of the structure.

10. A computing device, comprising: one or more memories; and one or more processors in communication with the one or more memories and configured to execute instructions stored in the one or more memories to perform operations comprising: performing first ranging measurements with a first plurality of electronic devices to obtain first ranging information for a first peer-to-peer communication system, the first ranging information providing first relative location information between the computing device and the first plurality of electronic devices; generating, using the first ranging information, a first relative location for the computing device in the first peer-to-peer communication system;

performing second ranging measurements with a second plurality of electronic devices to obtain second ranging information for a second peer-to-peer communication system, the second ranging information providing second relative location information between the computing device and the second plurality of electronic devices, wherein the first plurality of electronic devices are not within peer-to-peer communication range with the second plurality of electronic devices; generating, using the second ranging information, a second relative location for the computing device in the second peer-to-peer coordinate-communication system;

determining translation factors between the first peer-to-peer communication system and the second peer-to-peer communication system using the first relative location and the second relative location; and generating a universal coordinate system for the first peer-to-peer communication system and the second peer-to-peer communication system using the translation factor, the universal coordinate system providing a relative location between a first device of the first plurality of electronic devices and a second device of the second plurality of electronic devices.

11. The computing device of claim 10, wherein at least one of the first ranging measurements and the second ranging measurements are calculated by measuring a round trip time of a wireless signal.

12. The computing device of claim 10, wherein at least one of the first ranging measurements or the second ranging measurements is determined using ultrawideband ranging.

13. The computing device of claim 10, wherein the operations further comprise determining one or more translation factors by determining a lateral distance and a longitudinal distance between the first relative location and the second relative location.

14. The computing device of claim 10, wherein the operations further comprise determining one or more translation factors by determining a movement vector of the computing device using sensors on the computing device.

15. The computing device of claim 10, wherein the generating the universal coordinate system comprises: accessing a first mapping of electronic devices of the first peer-to-peer communication system; accessing a second mapping of electronic devices of the second peer-to-peer communication system; designated either the first mapping of electronic devices or the second mapping of electronic devices as an initial universal mapping of electronic devices;

and shifting locations of the electronic devices in the first mapping of electronic devices or the second mapping of electronic devices.

16. The computing device of claim 15, wherein the shifting is a lateral and a longitudinal shift of the locations of the electronic devices.

17. The computing device of claim 10, wherein the first and second peer-to-peer communication systems comrpise levels of an underground parking garage.

18. The computing device of claim 17, wherein the operations further comprise:

determining a location of an electronic tag within a structure based on the universal coordinate system; accessing a virtual map of the structure; and displaying the location of the electronic tag in the virtual map of the structure.

19. A non-transitory, computer-readable medium storing a plurality of instructions that, when executed by one or more processors of a computing device, cause the one or more processors to perform operations comprising: performing first ranging measurements with a first plurality of electronic devices to obtain first ranging information for a first peer-to-peer communication system, the first ranging information providing first relative location information between the computing device and the first plurality of electronic devices; generating, using the first ranging information, a first relative location for the computing device in the first peer-to-peer communication system; performing second ranging measurements with a second plurality of electronic devices to obtain second ranging information for a second peer-to-peer communication system, the second ranging information providing second relative location information between the computing device and the second plurality of electronic devices, wherein the first plurality of electronic devices are not within peer-to-peer communication range with the second plurality of electronic devices; generating, using the second ranging information, a second relative location for the computing device in the second peer-to-peer communication system; determining translation factors between the first peer-to-peer communication system and the second peer-to-peer communication system using the first relative location and the second relative location; and generating a universal coordinate system for the first peer-to-peer communication system and the second peer-to-peer communication system using the translation factor, the universal coordinate system providing a relative location between a first device of the first plurality of electronic devices and a second device of the second plurality of electronic devices.

20. The non-transitory, computer-readable medium of claim 19, wherein at least one of the first ranging measurements and the second ranging measurements are calculated by measuring a round trip time of a wireless signal.

* * * * *